US012671209B1

(12) United States Patent
Lamb et al.

(10) Patent No.: US 12,671,209 B1
(45) **Date of Patent: *Jun. 30, 2026**

(54) POWER CABLE PLUG CONNECTOR

(71) Applicant: CAMCO MANUFACTURING, LLC, Greensboro, NC (US)

(72) Inventors: Blake Lamb, Harrells, NC (US); Niko Jovicevic, Statesville, NC (US); Bruce Andrew Angel, Stokesdale, NC (US)

(73) Assignee: Camco Manufacturing, LLC, Greensboro, NC (US)

( * ) Notice: Subject to any disclaimer, the term of this patent is extended or adjusted under 35 U.S.C. 154(b) by 408 days.

This patent is subject to a terminal disclaimer.

(21) Appl. No.: 18/473,529

(22) Filed: Sep. 25, 2023

Related U.S. Application Data

(63) Continuation-in-part of application No. 17/932,001, filed on Sep. 14, 2022, now Pat. No. 12,288,948.

(51) Int. Cl.

| | |
|---|---|
| ***H01R 13/52*** | (2006.01) |
| ***H01R 13/512*** | (2006.01) |
| ***H01R 13/66*** | (2006.01) |
| ***H01R 13/717*** | (2006.01) |
| ***H01R 43/24*** | (2006.01) |
| *H01R 13/633* | (2006.01) |
| *H01R 105/00* | (2006.01) |

(52) U.S. Cl.
CPC ....... *H01R 13/5216* (2013.01); *H01R 13/512* (2013.01); *H01R 13/5213* (2013.01); *H01R 13/6616* (2013.01); *H01R 13/6666* (2013.01); *H01R 13/6683* (2013.01); *H01R 13/7175* (2013.01); *H01R 43/24* (2013.01); *H01R 13/6335* (2013.01); *H01R 2105/00* (2013.01)

(58) Field of Classification Search
CPC .............. H01R 13/5216; H01R 13/512; H01R 13/5213; H01R 13/6616; H01R 13/6666; H01R 13/6683; H01R 13/7175; H01R 43/24; H01R 13/6335; H01R 2105/00
See application file for complete search history.

(56) References Cited

U.S. PATENT DOCUMENTS 5,251,092 A * 10/1993 Brady ................ H01R 13/6666 361/111
5,844,763 A * 12/1998 Grace ................ H01R 13/6666 361/111
6,267,627 B1 * 7/2001 Lin ........................ H01R 24/30 439/106

(Continued)

*Primary Examiner* — Truc T Nguyen
(74) *Attorney, Agent, or Firm* — Tuggle Duggins PA; Blake P. Hurt

(57) ABSTRACT

A power cable plug connector including an electronics configuration and terminal configuration arranged to conduct an incoming power signal from a power source and filter harmful transient power signals away from the power signal. The electronics configuration is covered by an electronics housing and the negative space therein is filled with silicone encapsulate. The terminal configuration is overmolded to form the terminal housing. The terminal housing and electronics housing are fastened together to form a rugged internal assembly. The power cable plug connector includes an overmolded outer housing to prevent debris, temperature, shock, moisture, and vibration from damaging the electronics configuration and terminal configuration.

20 Claims, 21 Drawing Sheets

(56) References Cited

U.S. PATENT DOCUMENTS

| | | | | |
|---|---|---|---|---|
| 7,101,226 | B1 * | 9/2006 | Gilliland | H01R 13/652 439/957 |
| 8,469,730 | B2 * | 6/2013 | Garb | H01R 31/065 439/166 |
| 2008/0009145 | A1 * | 1/2008 | Zhou | H01R 13/6658 439/55 |
| 2011/0223803 | A1 * | 9/2011 | Mortun | H01R 13/6666 29/854 |
| 2014/0213110 | A1 * | 7/2014 | Wu | H01R 43/26 439/607.22 |
| 2014/0220806 | A1 * | 8/2014 | Liang | H01R 31/065 439/284 |
| 2015/0056865 | A1 * | 2/2015 | Guo | H01R 13/6658 439/660 |
| 2022/0021210 | A1 * | 1/2022 | Cairoli | H02J 3/14 |
| 2023/0163535 | A1 * | 5/2023 | Glendinning | H01R 13/713 439/490 |

* cited by examiner

POWER CABLE PLUG CONNECTOR

This is a continuation-in-part of and claims benefits under pending prior application Ser. No. 17/932,001 filed 14 Sep. 2022, entitled "POWER CABLE PLUG CONNECTOR", in the United States Patent and Trademark Office, which is incorporated by reference in its entirety herein.

FIELD OF THE INVENTION

The disclosure herein pertains to circuit analyzers generally, and particularly pertains to a power cable plug connector including an outer housing overmolded over an electronics housing retaining an electronics configuration and filled with silicone encapsulate, the electronics housing fastened to a terminal housing defined as an overmold over a terminal configuration, used to prevent debris, temperature, shock, moisture, and vibration from damaging the electronics configuration and terminal configuration.

DESCRIPTION OF THE PRIOR ART AND OBJECTIVES OF THE INVENTION

Electronic devices connected to a circuit are generally designed to operate properly at specific voltage and currents. When a power source connected to the circuit experiences a transient overvoltage, the electronic devices connected will also experience a transient overvoltage. These transient overvoltages, or transients, are sudden changes in the incoming power signal that last for short durations of time but may have harmful voltage spikes that can damage or even destroy electronic devices connected to the circuit. These sudden changes (or transients) are often inevitable during electrical transmission which may be caused by power outages, lightning strikes, and power transitions in larger high-power devices connected to the circuit.

Surge protectors are devices that may be individual components located within electronic devices or may be separate electronic devices that connect to the circuit to filter transients by diverting the transient signals to a ground wire, absorbing the transient signals to release it as heat, or both. Surge protectors are rated according to the amount of energy they can filter before they malfunction. Surge protector components within electronic devices protect the circuitry of the electronic device, but do not generally protect additional electronic devices that may be connected to the circuit.

A circuit analyzer may be used to measure the voltage and/or current of an incoming power signal to detect whether the power source and power wires are wired properly connected or contain harmful transient signals. If the circuit analyzer indicates a problem with the incoming power signal electronic device, it can warn against electrically connecting electronic devices to the power source, for example with an optical indicator, an audible alarm, or the like.

The present disclosure relates to a power cable plug connector including terminal contacts configured to engage a power source and conduct an incoming power signal of the power source, a surge protection configured device to filter potentially destructive transients, and a circuit analysis device housed within a single housing assembly, so that a non-transient power signal is transmitted to a system circuit and electronic devices connected to the system circuit are protected from harmful transients. Prior power cable plug connectors fail to compartmentalize terminal contacts, surge protection devices, and circuit analysis devices within a plug connector housing, whereas the present disclosure advantageously combines and compartmentalizes these components within a compact plug connector housing, while preventing debris, temperature, shock, moisture, and vibration from damaging the electronics configuration and terminal configuration.

Compartmentalizing these components within a plug connector housing reduces the number of electrical connections required to conduct and analyze an incoming power signal and to transmit a protected, non-transient signal to a system circuit. In addition, because the present disclosure efficiently compartmentalizes these components in a single housing, less electrical wires are needed to facilitate the electrical connection between the components and the rest of the system circuit. Having less electrical wiring reduces the overall cost and length the power signal must travel, greatly reducing the potential for voltage drop, which occurs often in circuits that contain unnecessarily long electrical wiring.

Thus, in view of the problems and disadvantages associated with prior art devices, the present disclosure was conceived and one of its objectives is to provide a power cable plug connector including an outer housing molded over an electronics housing retaining an electronics configuration, and a terminal housing retaining a terminal configuration, to prevent debris, temperature, shock, moisture, and vibration from damaging the electronics configuration and terminal configuration.

It is another objective of the present disclosure to provide a power cable plug connector including terminal contacts configured to electrically connect a system circuit and transmit a protected, non-transient signal to the system circuit.

It is still another objective of the present disclosure to provide a power cable plug connector including an outer housing molded over an internal assembly to form a single, seamless outer housing.

It is yet another objective of the present disclosure to provide a power cable plug connector configured to electrically connect a power cable to a terminal contact within the housing assembly so that a non-transient power signal is transmitted throughout the system circuit.

It is a further objective of the present disclosure to provide a power cable plug connector including an electronics configuration electrically connected to a terminal configuration, wherein the electronics configuration is encapsulated in silicone to protect the components of the electronics configuration, and the terminal configuration is molded over to form a terminal housing.

It is still a further objective of the present disclosure to provide a power cable plug connector comprising a terminal configuration arranged to engage a 30-amp power source and conduct the power signal of the 30-amp power source, and an electronics configuration arranged to filter transient power signals away from the power signal.

It is yet another objective of the present disclosure to provide a power cable plug connector comprising a terminal configuration arranged to engage a 50-amp power source and conduct the power signal of the 50-amp power source, and an electronics configuration arranged to filter transient power signals away from the power signal.

It is yet another objective of the present disclosure to provide a power cable plug connector comprising an outer housing molded over an internal assembly, forming a handle and a strain relief clamp.

Various other objectives and advantages of the present disclosure will become apparent to those skilled in the art as a more detailed description is set forth below.

SUMMARY OF THE INVENTION

The aforesaid and other objectives are realized by providing a power cable plug connector for conducting an incoming power signal from a power source, the power cable plug connector includes an internal assembly comprising an electronics configuration and a terminal configuration. The internal assembly may further include a terminal housing for retaining the terminal configuration and an electronics housing for retaining the electronics configuration. The terminal housing is formed by overmolding the terminal configuration to allow a portion of the terminal configuration to protrude from a bottom side of the terminal housing. The electronics configuration is placed within the electronics housing and the negative space within the electronics housing is filled with silicone encapsulate. The electronics configuration is arranged to conduct the incoming signal, detect one or more circuit measurements, including the voltage, current, amperage, and continuity of the incoming power signal of the power source, and filter transient signals away from the incoming power signal, so that a protected, non-transient power signal is transmitted through the system circuit.

In one embodiment of the power cable plug connector, the internal assembly is overmolded to form a single piece, seamless outer body housing. In the preferred embodiment, the system circuit is an RV including various electrical devices electrically connected to the system circuit. In other embodiments, the power wire is electrically adapted to be connected to a system circuit that may include more than one electrical device.

DETAILED DESCRIPTION OF THE PREFERRED EMBODIMENT AND OPERATION OF THE INVENTION

Figure 1:
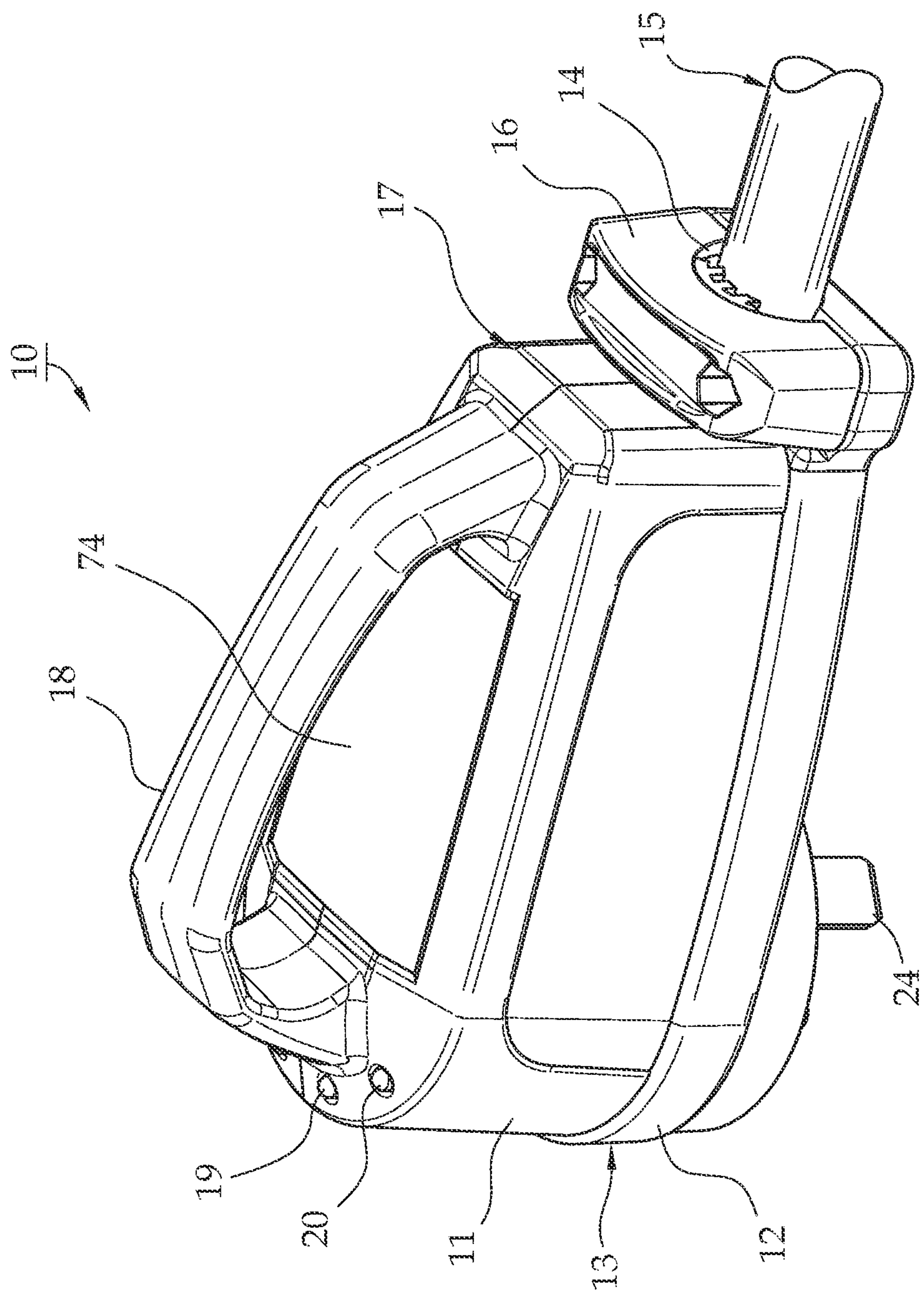
FIG. 1 shows a perspective view of power cable plug connector of the instant disclosure.

Various exemplary embodiments of the present disclosure are described below. Use of the term "exemplary" means illustrative or by way of example only, and any reference herein to "the disclosure" is not intended to restrict or limit the disclosure to exact features or step of any one or more of the exemplary embodiments disclosed in the present specification. References to "exemplary embodiment", "one embodiment", "an embodiment", "various embodiments", and the like may indicate that the embodiment(s) of the disclosure so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the disclosure or to imply that certain features are critical, essential, or even important to the structure or function of the disclosure. Rather, these terms are merely intended to highlight alternative or additional features that may or may not be utilized in a particular embodiment of the present disclosure.

The present disclosure is described more fully hereinafter with reference to the accompanying figures, in which one or more exemplary embodiments of the disclosure are shown.

Like numbers used herein refer to like elements throughout. The disclosure may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the disclosure, and any and all equivalents thereof. Moreover, many embodiments such as adaptations, variations, modifications, and equivalent arrangements will be implicitly disclosed by the embodiments described herein and fall within the scope of the instant disclosure.

Although specific terms are employed herein, they are used in a generic and descriptive sense only and not for the purposes of limitation. Unless otherwise expressly defined herein, such terms are intended to be given their broad, ordinary, and customary meaning, not inconsistent with that applicable in the relevant industry and without restriction to any specific embodiment hereinafter described. As used herein, the article “a” is intended to include one or more items. Where only one item is intended, the terms “one and only one”, “single”, or similar language is used. When used herein to join a list of items, the term “or” denotes at least one of the items but does not exclude a plurality of items of the list.

As used herein, “mold over”, “overmold”, “overmolding” and “overmold process” refer to the process that combines multiple components, assemblies, and materials into a single, seamless part. A material is usually molded onto a component or assembly of components that is placed in the mold cavity. Over molding reduces the need for product assembly since the components are manufactured right on top of one another. This approach results in a stronger, more durable overall design that is very efficient in preventing debris, temperature, shock, moisture, and vibration from damaging the internal assembly.

For exemplary methods or processes of the disclosure, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present disclosure.

Additionally, any references to advantages, benefits, unexpected results, or operability of the present disclosure are not intended as an affirmation that the disclosure has previously been reduced to practice or that any testing has been performed. Likewise, unless stated otherwise, use of verbs in the past tense (present perfect or preterit) is not intended to indicate or imply that the disclosure has previously been reduced to practice or that any testing has been performed.

For a better understanding of the disclosure and its operation, turning now to the drawings, FIGS. 1-9 illustrate various views and orientations of an embodiment of a power cable plug connector 10. Throughout the description and illustrations, the power cable plug connector 10, as seen in FIGS. 1-9, is represented as power cable plug connector 10 for conducting an incoming power signal 56 of a power source 57 and filtering a transient power signal 58 out of the incoming power signal 56 so that a protected, non-transient power signal 59 is transmitted to a system circuit 60. The power cable plug connector 10 includes a housing assembly 13 formed by a base 12 and a cover 11, and an internal assembly 41 positioned within the housing assembly 13. As seen in FIG. 7A, the internal assembly 41, held together within the terminal housing 32 and electronics housing 33 and by an internal assembly holder 42, includes a terminal configuration 46 arranged to engage the power source 57 and to conduct the incoming power signal 56 of the power source 57, and an electronics configuration 50 electrically connected to the terminal configuration 46. The electronics configuration 50 filters the transient power signal 58 from the incoming power signal 56 so that a protected, non-transient power signal 59 is sent to the system circuit 60 via a power wire 39 contained in the power cable 15.

Figure 6A:
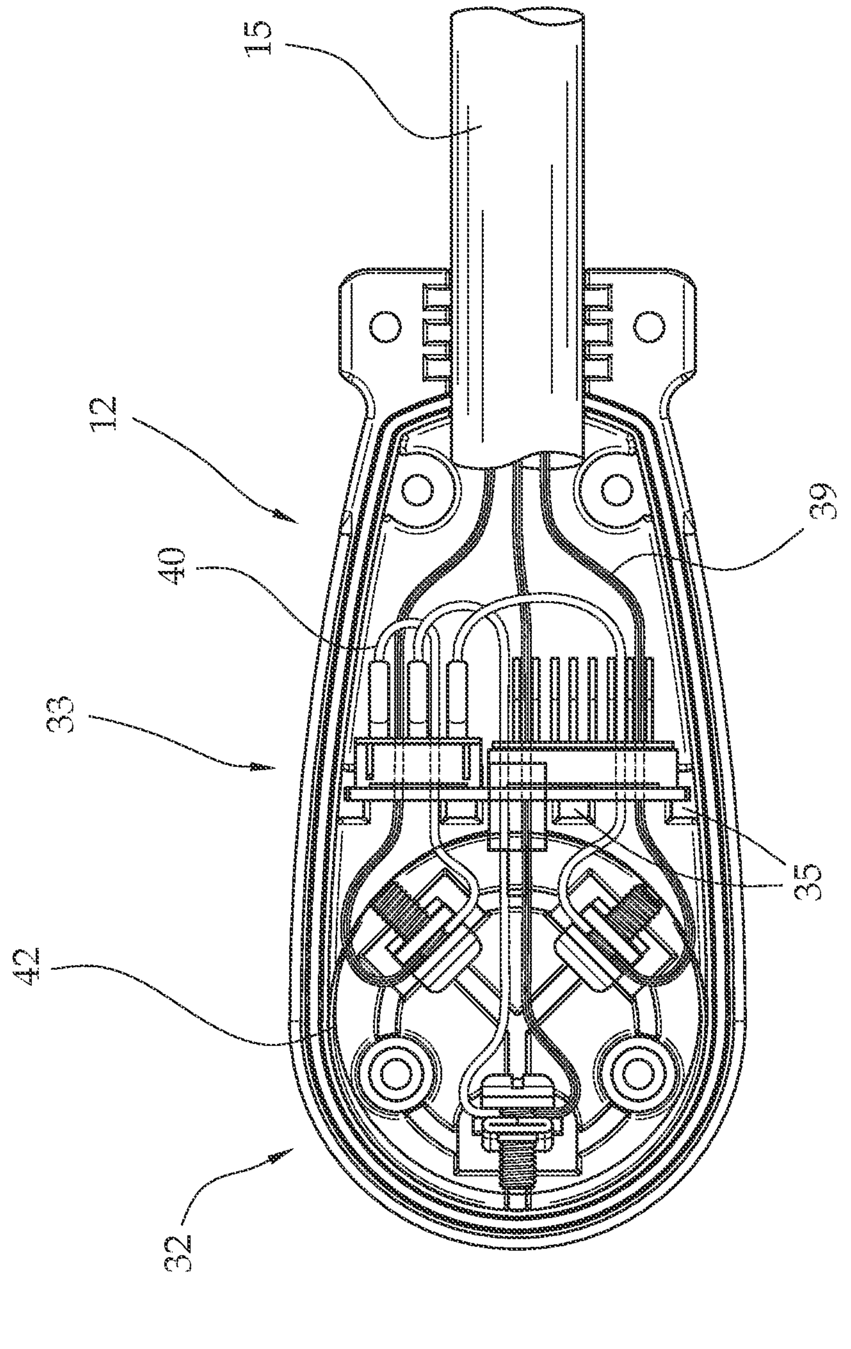
FIG. 6A features a top plan view of the base interior surface of the power cable plug connector of FIG. 5A illustrating a plurality of power wires and a plurality of electrical wires situated around a substantially vertical electronics configuration.
Figure 6B:
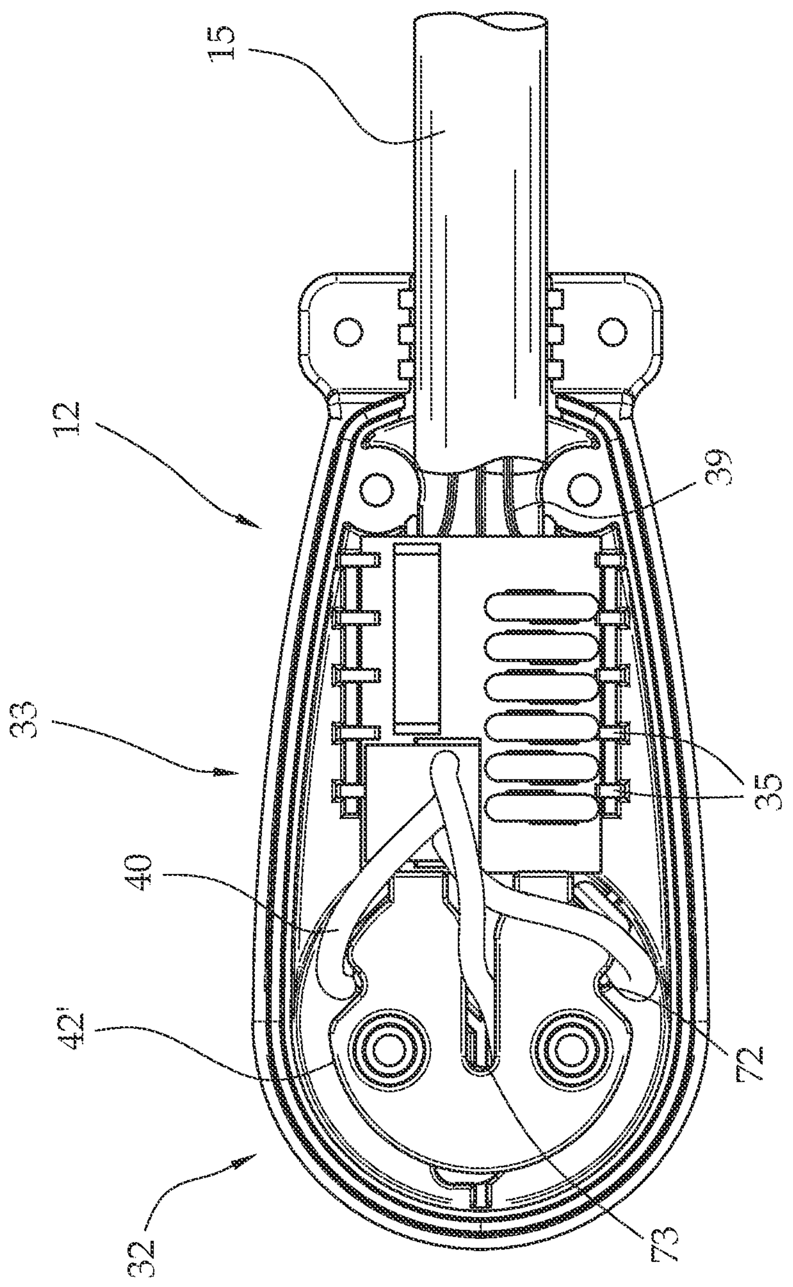
FIG. 6B features a top plan view of the base interior surface of the power cable plug connector of FIG. 5B illustrating a plurality of power wires and a plurality of electrical wires situated around a substantially horizontal electronics configuration.
Figure 7A:
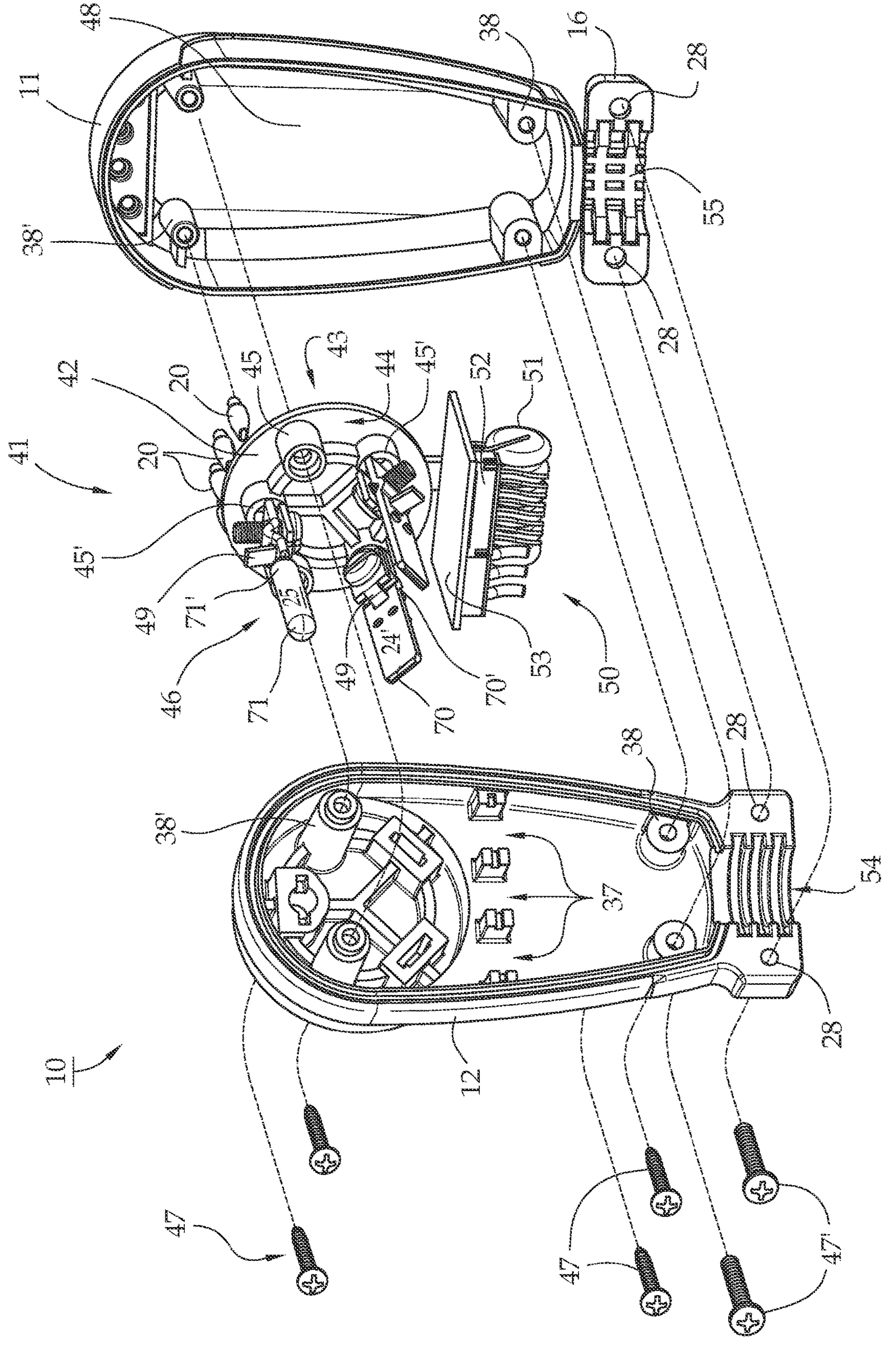
FIG. 7A shows an exploded perspective view of the power cable plug connector of FIG. 6A.
Figure 7B:
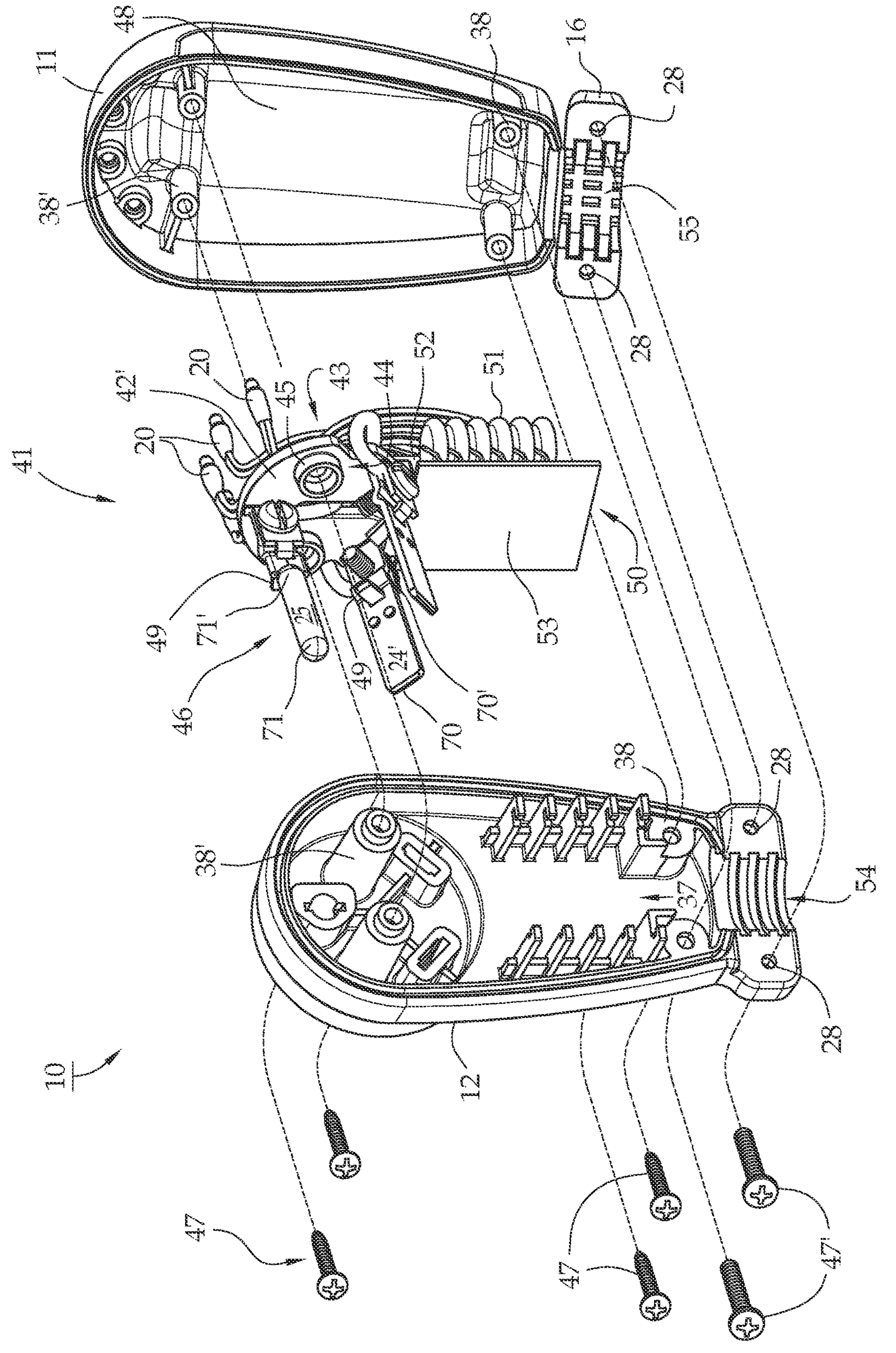
FIG. 7B shows an exploded perspective view of the power cable plug connector of FIG. 6B.

As demonstrated in FIG. 1, the power cable plug connector 10 includes a cover 11 and a base 12, each are configured to join to one another to form a housing assembly 13. An internal assembly 41 comprising a terminal configuration 46 and an electronics configuration 50 is positioned within the housing assembly 13 and supported within the terminal housing 32 and electronics housing 33, respectively (as shown in FIG. 7A-B). A first end 70 of a contact 24, such as terminal blade 24' of the terminal configuration 46, protrudes from the base 12. The housing assembly 13 defines an aperture 14 dimensioned to receive and engage a portion of a power cable 15 containing a power wire 39 (as shown in FIG. 6A-B), whereby the power wire 39 is electrically adapted to be connected to a system circuit 60. The aperture 14 may be formed when the cover 11 and base 12 are joined together, or alternatively, the aperture 14 may be formed exclusively in the cover 11 of the housing assembly 13 (not shown). It shall be understood that the power wire may either be electrically adapted to be connected to a system circuit 60 or the power wire 39 is already electrically connected to a system circuit 60. The housing assembly 13 also may preferably include a strain relief clamp 16 to reduce the overall dimensions of the aperture 14 defined by the housing assembly 13 and to reduce the strain on the power cable 15. The cover 11 has a top exterior surface 17 that includes a handle 18 affixed to or defined by the top exterior surface 17 to facilitate a safe way to grip the power cable plug connector 10. The cover 11 defines at least one hole 19 to support an electrically connected display, such as LED display 20 to indicate a status of the system circuit 60. Holes 19 are preferably defined on the cover 11 so that the LED display 20 is visible by a user when the user grips the handle 18 of the power cable plug connector 10.

Figure 2:
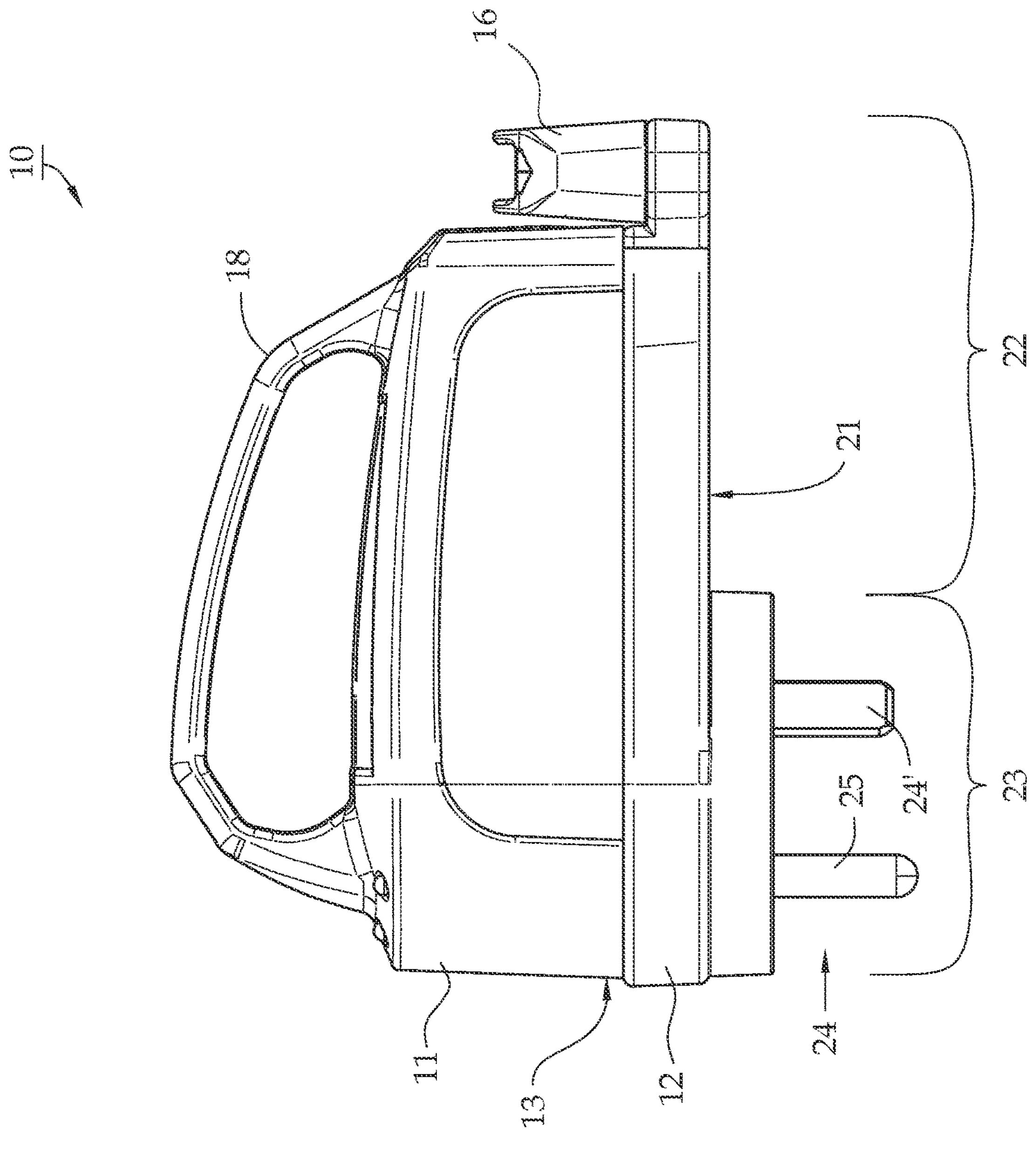
FIG. 2 pictures an elevated side view of the power cable plug connector of FIG. 1, it being understood that the opposing side is a mirror image thereof.
Figure 4:
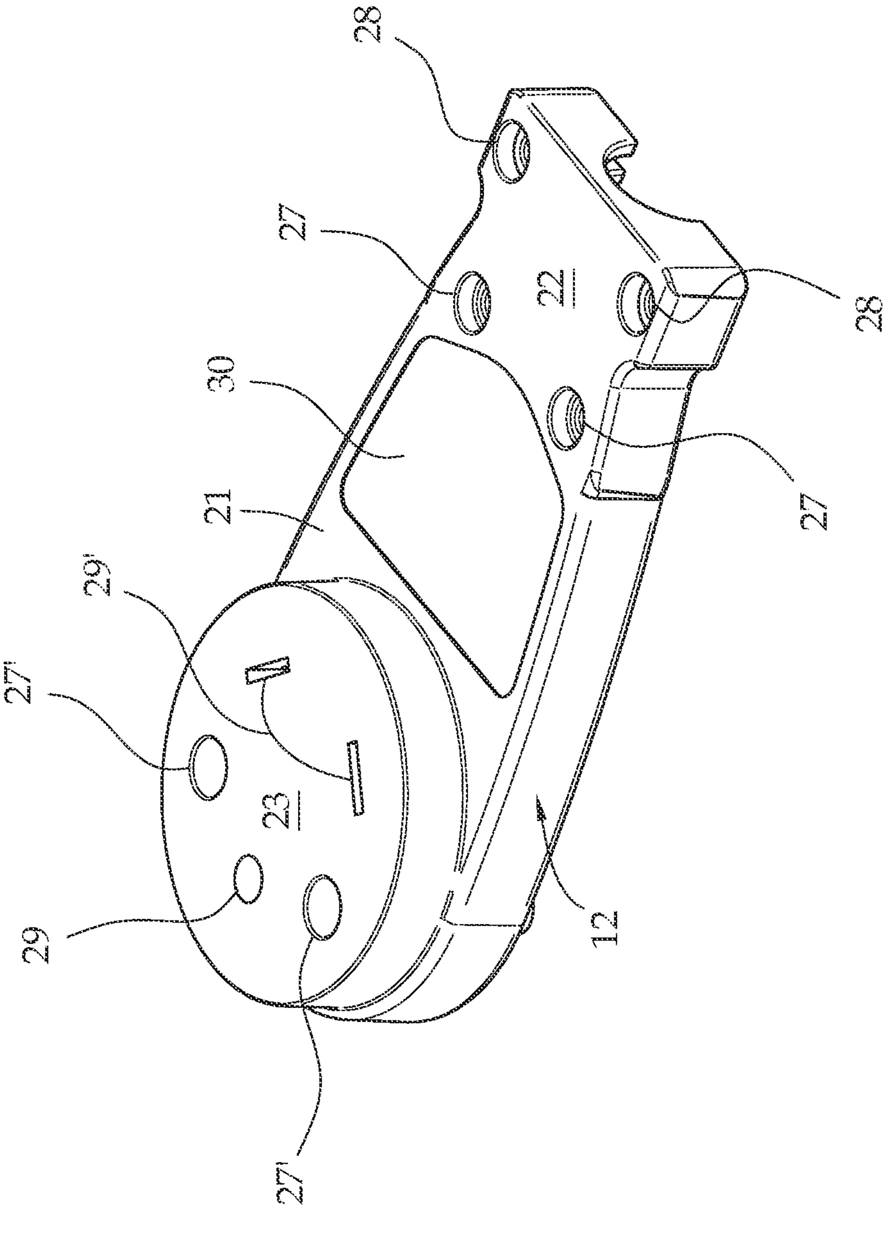
FIG. 4 demonstrates a perspective view of the base exterior surface of the power cable plug connector of FIG. 1.

FIG. 2 illustrates a side view of the power cable plug connector 10 showing the cover 11 and base 12 joined together to form the housing assembly 13. The strain relief clamp 16 is configured to removably join one or more aspects of housing assembly 13, preferably at base 12, to reduce one or more dimensions of the aperture 14 so that the housing assembly 13 engages more securely with and relieves strain on the power cable 15. The strain relief clamp 16 is preferably a separate component from the cover 11 and base 12, however, in alternative embodiments, the strain relief clamp 16 may be integrally formed into either the cover 11 or the base 12. The base 12 further includes a bottom exterior surface 21 formed of a substantially planar surface 22 and a raised, cylindrical surface 23 such as seen in FIGS. 2 and 4. The raised, cylindrical surface 23 is preferably an extruded cylindrical projection on the bottom exterior surface 21 that extends away, and generally perpendicularly to, the bottom exterior surface 21 to define a cavity within the housing assembly 13. A terminal blade 24' of the terminal configuration 46 is positioned within the housing assembly 13 and is supported in a terminal housing 32 so that one end 70 of the terminal blade 24' protrudes from within the housing assembly 13 through the raised, cylindrical surface 23. In the preferred embodiment, as depicted in FIG. 2, the terminal configuration 46 includes one or more terminal blade(s) 24' and a ground pin 25, each positioned within the housing assembly 13 and supported in the terminal housing 32 so that one end 70, 71, respectively protrudes from the housing assembly 13 through one of holes 29, 29' defined in the raised, cylindrical surface 23 as seen in FIG. 4.

Figure 3:
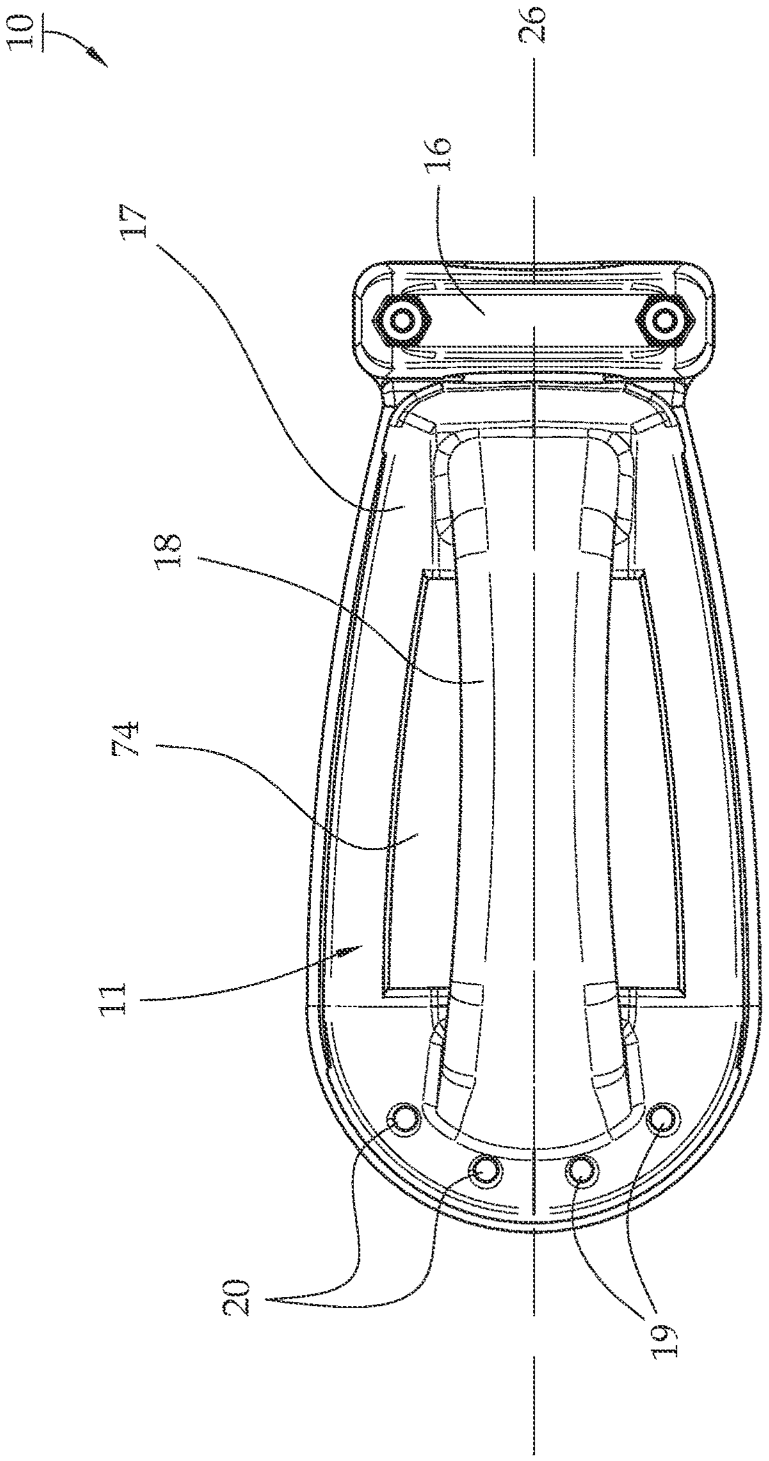
FIG. 3 depicts a top plan view of the power cable plug connector of FIG. 1.

FIG. 3 depicts a top plan view of preferred power cable plug connector 10 showing the handle 18 preferably oriented along a longitudinal axis 26 of the cover 11 to provide a stable and safe means for a user to grip the power cable plug connector 10. In other embodiments (not shown) the handle 18 is not oriented along the longitudinal axis 26 and is still capable of providing a stable and safe means for a user to grip the power cable plug connector 10. The handle 18 may be constructed of a non-conducting material to further enhance the safety of power cable plug connector 10 by inhibiting circuit flow through the handle 18. The handle 18 is preferably a pull handle, wherein both ends of the handle are connected to the cover 11 by using handle fasteners (not shown) or wherein both ends of the handle are integrally formed in the top exterior surface 17 of the cover 11. In an alternative embodiment (not shown), the handle may be an L-Handle, wherein a single end of the handle 18 is fastened to or integrally formed in the cover 11 of the housing assembly 13. The LED display 20, as shown in FIG. 3, are preferably located on the top exterior surface 17 of the cover 11 so that a user can easily see the status of the system circuit 60 while gripping the handle 18 during use. In other embodiments (not shown), the power cable plug connector 10 does not include the handle 18 and the user grips the sides of the housing assembly 13.

FIG. 4 is a perspective view of the bottom exterior surface 21 of the base 12 showing the substantially planar surface 22 and the raised, cylindrical surface 23. The bottom exterior surface 21 of the base 12 defines a plurality of holes 27, 27', 28, 29, 29'. Holes 27 in surface 22 and 27' in raised surface 23 may be configured (i.e., sized, shaped, and otherwise oriented) to receive mechanical fasteners 47 to removably join the cover 11 and the base 12 together to form the housing assembly 13. Holes 28 in surface 22 may be configured to receive mechanical fasteners 47' to removably join the strain clamp 16 with the base 12. Holes 29, 29' in raised surface 23 may be configured to permit a portion of the terminal configuration 46 to protrude from within the housing assembly 13 through the base 12. In the preferred embodiment, as shown in FIG. 4, the bottom exterior base surface 21 defines four holes 27, 27', two holes 27 defined on the substantially planar surface 22 and two holes 27' defined on the raised, cylindrical surface 23. Each respective hole 27, 27' defines a threaded hole configured to receive a threaded mechanical fastener 47 to removably join the cover 11 and base 12 to form the housing assembly 13. In the preferred embodiment, the bottom exterior surface 21 also defines two holes 28 on the substantially planar surface 22, holes 28 are configured to receive a threaded mechanical fastener 47' to removably join the strain clamp 16 to the base 12, as illustrated in FIGS. 1, 2, 3, and 7. In the preferred embodiment, the bottom exterior surface 21 further defines holes 29, 29' on the raised, cylindrical surface 23, hole 29 is configured to permit a first end 71 of the ground pin 25 to protrude from within the housing assembly 13 through the base 12, and holes 29' are configured to permit a first end 70 of the terminal blades 24' to protrude from within the housing assembly 13 through the base 12. In the preferred embodiment, holes 29, 29' defined on the raised, cylindrical surface 23 are arranged to permit a terminal configuration 46 capable of engaging, communicating, and conducting a power signal from a 30-amp power source receptacle 57 to protrude from within the housing assembly 13 through the base 12. Those skilled in the art understand that hole 29 and holes 29' may be configured to allow the terminal configuration 46 to engage, communicate, and conduct a power signal from any power source receptacle 57 configuration, such as but not limited to, 15-amp, 20-amp, and 50-amp power source receptacle 57 configurations. The substantially planar surface 22 may include a slightly depressed surface 30 to provide a location for affixing a label on the slightly depressed surface so that the label is flush with the rest of the substantially planar surface 22. The top exterior surface 17 of the cover 11 may also include a slightly depressed surface 74 located underneath the handle 18. The label may be affixed within the depressed surfaces 30, 74 through use of a mechanical fastener, an adhesive, or any other means capable of affixing the label to the base. The label may include information about the product, including, but not limited to, instructions for proper use, information about the manufacturer, patent numbers, logos, rating certifications, and the like.

Figure 5A:
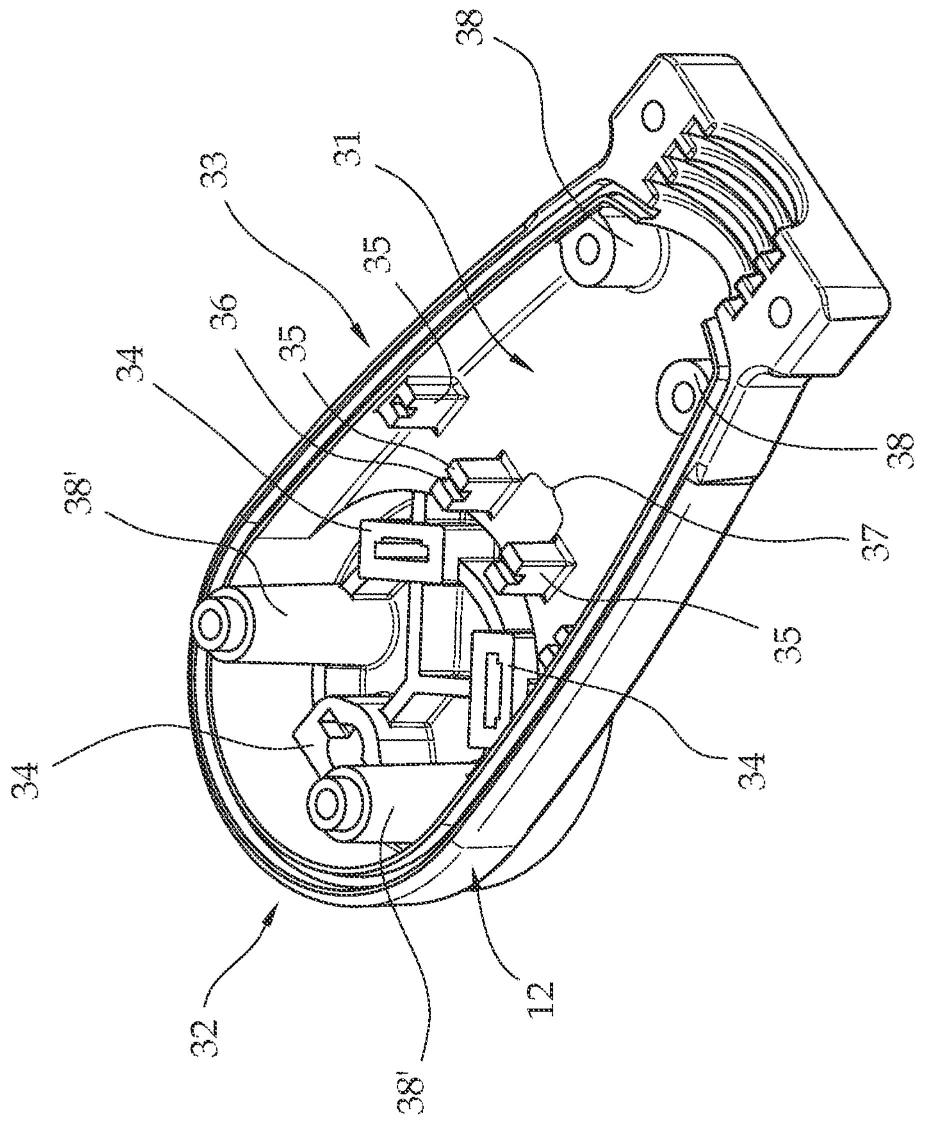
FIG. 5A illustrates a perspective view of one embodiment of the base interior surface of the power cable plug connector.
Figure 5B:
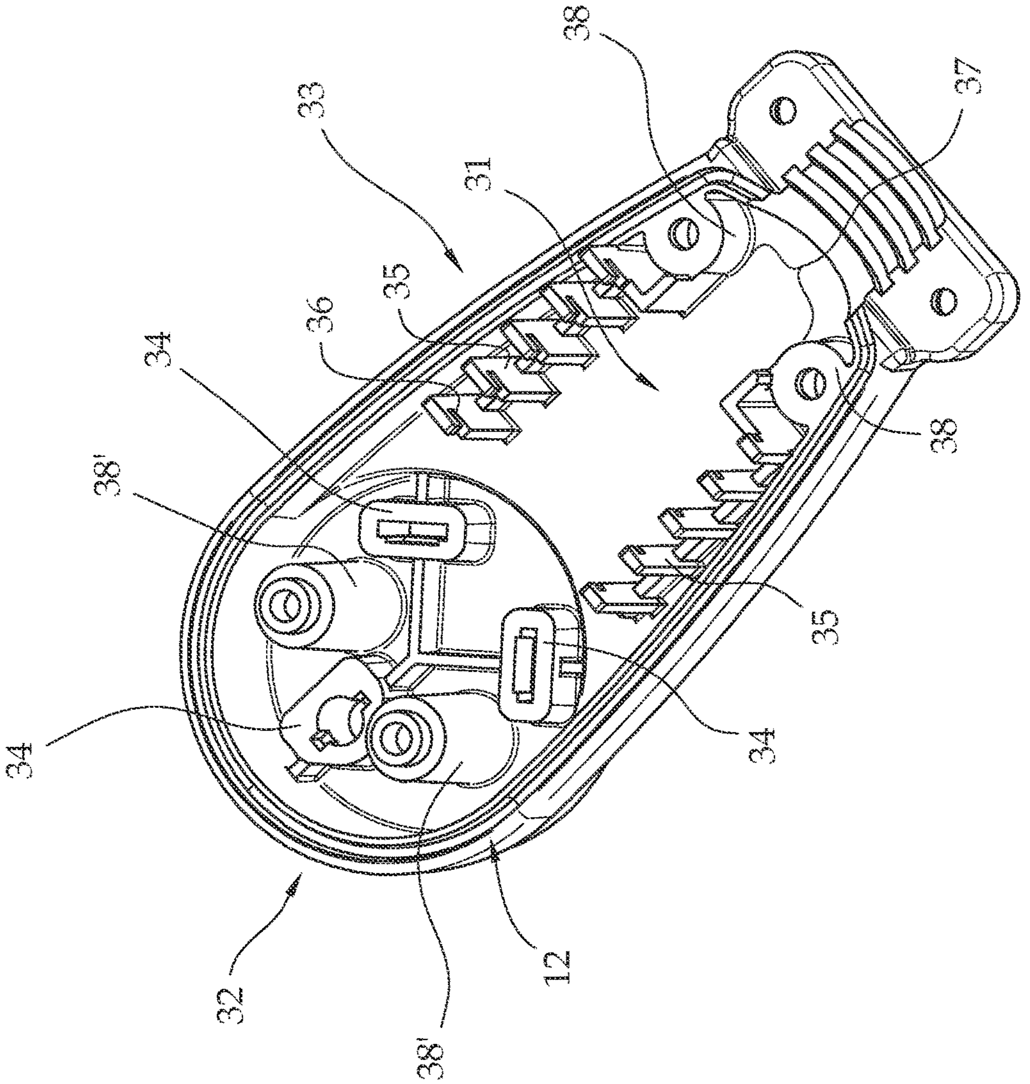
FIG. 5B illustrates a perspective view of an alternate embodiment of the base interior surface of the power cable plug connector.

FIG. 5A and FIG. 5B illustrate two different embodiments of a base interior surface 31, including a terminal housing 32 and an electronics housing 33. The terminal housing 32 is defined by and positioned in the cavity formed by the raised, cylindrical surface 23 on the bottom exterior surface 21. The terminal housing includes a plurality of bosses 34 disposed on a bottom surface of the cavity, the bosses configured to receive and support the terminal configuration 46. The bosses 34 are arranged to permit a terminal configuration 46 capable of engaging and conducting the incoming power signal 56 from a 30-amp power source receptacle 57, protrude from within the housing assembly 13 through the base 12, and to support the terminal configuration 46 within the housing assembly 13. The electronics housing 33 is defined by a plurality of posts 35 extending upwardly from the base interior surface 31, each post 35 defining a notch 36. The plurality of posts 35 define at least one channel 37 that enables electrical wires facilitating electrical communication to be positioned within the channel so that they may reach the terminal configuration 46 and be secured within the housing assembly 13. In one embodiment, as illustrated in FIG. 5A, the electronics housing 33 is defined by four posts 35 arranged on the base interior surface 31 along a single lateral axis located near the mid-line of the base 12 such that the notches 36 are configured and arranged to receive and support an electronics configuration 50 positioned within the housing assembly 13 in a substantially vertical orientation. In another embodiment, as illustrated in FIG. 5B, the electronics housing 33 is defined by two sets of five posts 35, each set of posts 35 positioned and arranged on the base interior surface 31 along two longitudinal axes located near the longitudinal edges of the base 12 such that the notches 36 are configured and arranged to receive and support the electronics configuration 50 positioned within the housing assembly 13 in a substantially horizontal orientation. In embodiment illustrated in FIG. 5A, the four posts 35 define three separate channels 37 to facilitate the placement of electrical wires (as shown in FIG. 6A). In embodiment illustrated in FIG. 5B, the two sets of five posts 35 define a single channel 37 to facilitate the placement of electrical wires (as shown in FIG. 6B).

FIGS. 5A and 5B also show a plurality of columns 38, 38' disposed on the base interior surface 31 for the receipt of mechanical fasteners 47 inserted through holes 27, 27', respectively, to removably join the cover 11 to the base 12. In the preferred embodiment, four columns 38, 38' are disposed on the base interior surface 31 and are arranged to cooperatively align with the four holes 27, 27', respectively, defined on the bottom exterior surface 21. It is preferred that at least one column 38' is disposed within the terminal housing 32 and at least one column 38 is disposed outside the terminal housing 32. It shall be understood that columns 38, 38' may also be configured on the base interior surface 31 to be concentric with columns 38, 38', respectively, disposed on a cover interior surface 48 as seen in both FIG. 7A and FIG. 7B to create a conduit for the receipt and support of mechanical fasteners 47 which secure the cover 11 to the base 12.

FIG. 6A and FIG. 6B are top plan views of the embodiments illustrated in FIG. 5A and FIG. 5B, respectively, showing the internal assembly 41 placed into and supported by the electronics housing 33 and terminal housing 32. The power cable 15 containing at least one power wire 39 (three power wires shown) includes a stripped (i.e., exposed) portion of the power wire 39 within the housing assembly 13. A plurality of electrical wires 40 electrically connects the electronics configuration 50 to the terminal configuration 46 so that the electronics configuration 50 can conduct the incoming power signal 56 when a power signal threshold 61 is reached and filter a transient power signal 58 out of the incoming power signal 56 so that a protected, non-transient power signal 59 is transmitted to the system circuit 60 via the power wire 39. The electronics configuration 50 also includes a circuit analyzer 52 that provides the real-time status of the system circuit 60 whereby the status is dependent on the one or more circuit measurements detected by the circuit analyzer 52. In the preferred embodiment, the surge protection device 51 is a transient suppressor 51 configured to remove high-voltage (or transient) power signals 58 from an incoming power signal 56, the transient suppressor 51 defines a surge protector device with variable impedance so that the high-voltage power signals 58 are diverted away from and, as a result, not transmitted to the system circuit 60. As illustrated in FIG. 6A, the electronics configuration 50 is retained within the housing assembly 13 is a substantially horizontal orientation. In the embodiment illustrated in FIG. 6A, the power wires 39 (three are illustrated) and electrical wires (three are illustrated) are routed through the three channels 37 defined by the four posts 35 so that the stripped (i.e., exposed) portion of the power wires 39 may bypass underneath the electronics housing 33 and electrically connect to the terminal configuration 46. In the embodiment illustrated in FIG. 6B, the power wires 39 (three are illustrated) are routed through the single channel 37 defined by the two sets of posts 35 so that the stripped (i.e., exposed) portion of the power wires 39 may bypass underneath the electronics housing 33 and electrically connect to the terminal configuration 46. The electrical wires 40 (three are illustrated) of the embodiment illustrated in FIG. 6B are routed through contours 72 and slot 73 defined in an internal assembly holder 42' so that the electrical wires 40 may electrically connect to the terminal configuration 46. The two electrical wires 40 that bypass the internal assembly holder 42' through the contours 72 connect the electronics configuration 50 to the terminal blades and the electrical wire 40 that bypasses the internal assembly holder 42' through the slot 73 connect the electronics configuration 50 to the ground pin 25.

The electronics configuration 50 includes a surge protection device 51 configured to filter the transient power signal 58 out of the incoming power signal 56. The transient suppressor 51 may be electrically connected to the system circuit 60 or incoming power signal 56 in series or in parallel to filter the transient power signal 58 out of the incoming power signal 56 when a power signal threshold 61 is reached so that a non-transient power signal 59 is transmitted to the system circuit 60. The transient suppressor 51 may be placed in series with the incoming power signal 56 to block potentially harmful transient power signals 58 from propagating through the system circuit 60 by absorbing the energy of the transient power signal 58 and releasing the energy over time as heat while permitting a protected, non-transient power signal 59 to transmit through the power wire 39. The transient suppressor 51 may also be placed in parallel with the incoming power signal 56 to divert the transient power signal 58 away from the incoming power signal 56 by grounding the transient power signal 58 of the incoming power signal 56. When placed in parallel with the incoming power signal 56, the transient suppressor 51 may define a variable impedance. Stated differently, when the incoming power signal 56 does not exceed the power signal threshold 61, the transient suppressor 51 has a high impedance and therefore does not conduct the incoming power signal 56, allowing a non-transient power signal 59 to propagate throughout the system circuit 60. However, when the incoming power signal 56 exceeds the power signal threshold 61, the transient suppressor 51 responds by adjusting the variable impedance to a low impedance and therefore conducts the incoming power signal 56 and diverts the transient power signal 58 away from the incoming power signal 56 via a ground wire 62. The power signal threshold 61 is the point where the transient suppressor 51 begins to lower impedance and to conduct the incoming power signal 56.

FIG. 7A and FIG. 7B illustrate perspective views of the power cable plug connector 10 of FIG. 6A and FIG. 6B, respectively, with various elements exploded therefrom. The internal assembly 41 is held together with internal assembly holder 42, 42'. The internal assembly holder 42, 42' preferably defines a top surface 43 and a bottom surface 44. The bottom surface 44 of the internal assembly holder 42, 42' rests above, facing the terminal housing 32 and the electronics housing 33. The bottom surface 44 of the internal assembly holder 42, 42' further includes a plurality of projections 45, 45' disposed on the bottom surface 44. Projections 45 may be configured to coincide and engage columns 38' disposed on the base interior surface 31 and to allow a mechanical fastener 47 to removably join the cover 11 and base 12 to form the housing assembly 13. Projections 45' may be configured to secure a second end 70', 71' of the terminal configuration 46 within the housing assembly 13. The bottom surface 44 of the internal assembly holder 42, 42' includes five projections 45, 45'—three projections 45' are arranged and configured to support the second end 70', 71' of the terminal configuration 46 and secure the second end 70', 71' of the terminal configuration 46 within the housing assembly 13 and two projections 45 are arranged and configured to coincide and engage columns 38' disposed on the base interior surface 31 and receive mechanical fasteners 47 that removably join the cover 11 to the base 12 and stabilize the internal assembly holder 42, 42' within the housing assembly 13. The internal assembly holder 42' illustrated in FIG. 6B and FIG. 7B includes two contours 72 and a single slot 73 so that the electrical wires 40 may bypass through the internal assembly holder 42' to electrically connect the electronics configuration 50 to the terminal configuration 46. Columns 38, 38' are configured on the base interior surface 31 to be concentric with columns 38, 38', respectively, disposed on the cover interior surface 48 to create a conduit for the receipt of mechanical fasteners 47 that removably join the cover 11 to the base 12.

In one embodiment, as illustrated in the Figures, the terminal configuration 46 includes three contacts 24—two terminal blades 24' and a ground pin 25. The first end 70 of the terminal blade 24' and the first end 71 of the ground pin 25 are arranged to protrude from within the housing assembly 13 through holes 29' and 29, respectively, and the respective opposite ends 70', 71' are secured within the projections 45 disposed on the bottom surface 44 of the holder 42. The terminal configuration 46 further includes a wire connector 49 attached to the second ends 70', 71' of the terminal blade 24' and ground pin 25 positioned within the housing assembly 13. The wire connectors 49 facilitate the electrical connection to conduct the incoming power signal 56 and transmit a protected, non-transient power signal 59 through the system circuit 60. In the preferred embodiments the wire connector 49 is a screw wire clamp made of a conductive material.

In the preferred embodiment, the electronics configuration 50 includes a surge protection device 51, a circuit analyzer 52, and a plurality of LED displays 20 electrically connected to the system circuit 60. The surge protection device 51 may be a transient suppressor, for example a non-linear passive electrical device, and in the preferred embodiment, the surge protection device 51 is a set of a plurality (six in the preferred embodiment) of metal-oxide-varistors ("MOVs") configured to dissipate up to 1,050 Joules out of an incoming power signal 56 when a predetermined transient power signal threshold 61 is reached. As shown in both FIG. 7A and FIG. 7B four LED displays 20 are positioned within the housing assembly 13 and are secured within the housing assembly 13 by the holes 19 defined on the top exterior surface 17 of the cover 11 so that the LED displays 20 are visible when a user grips the handle 18 of the power cable plug connector 10. The electronics configuration 50 may further include a printed circuit board 53 to facilitate the electrical connection between the electronics configuration 50, the terminal configuration 46, and the rest of the system circuit 60. In the preferred embodiment, the printed circuit board 53 includes an eight-pin connector to facilitate the electrical connection between the electronics configuration 50 and the LED displays 20 via an LED display wire (not shown) electrically connected to the eight-pin connector. In the preferred embodiment, the printed circuit board 53 also includes a three-pin connector to facilitate the electrical connection between the electronics configuration 50 and the terminal configuration 46.

The strain clamp 16 may be integrally formed on either the cover 11 or base 12 or may be a separate component configured to be received within a strain clamp chassis 54 disposed on either the cover 11 or the base 12. In the preferred embodiment, the strain clamp chassis 54 is a portion of the base 12 that extends beyond the cover 11 when the cover 11 is removably fixed to the base 12 to form the housing assembly 13. The strain clamp 16 optionally includes a strain clamp insert 55 configured to be received within a portion of the strain clamp 16 to further reduce one or more dimensions of the aperture 14 and more securely engage with and relieve strain on the power cable 15 inserted through the aperture 14. In the preferred embodiment, holes 28 are defined on either side of the strain clamp chassis 54 to permit a mechanical fastener 47 to pass through the holes 28 and removably join the strain clamp 16 (and optionally the strain clamp insert 55) to the strain clamp chassis 54.

Figure 8:
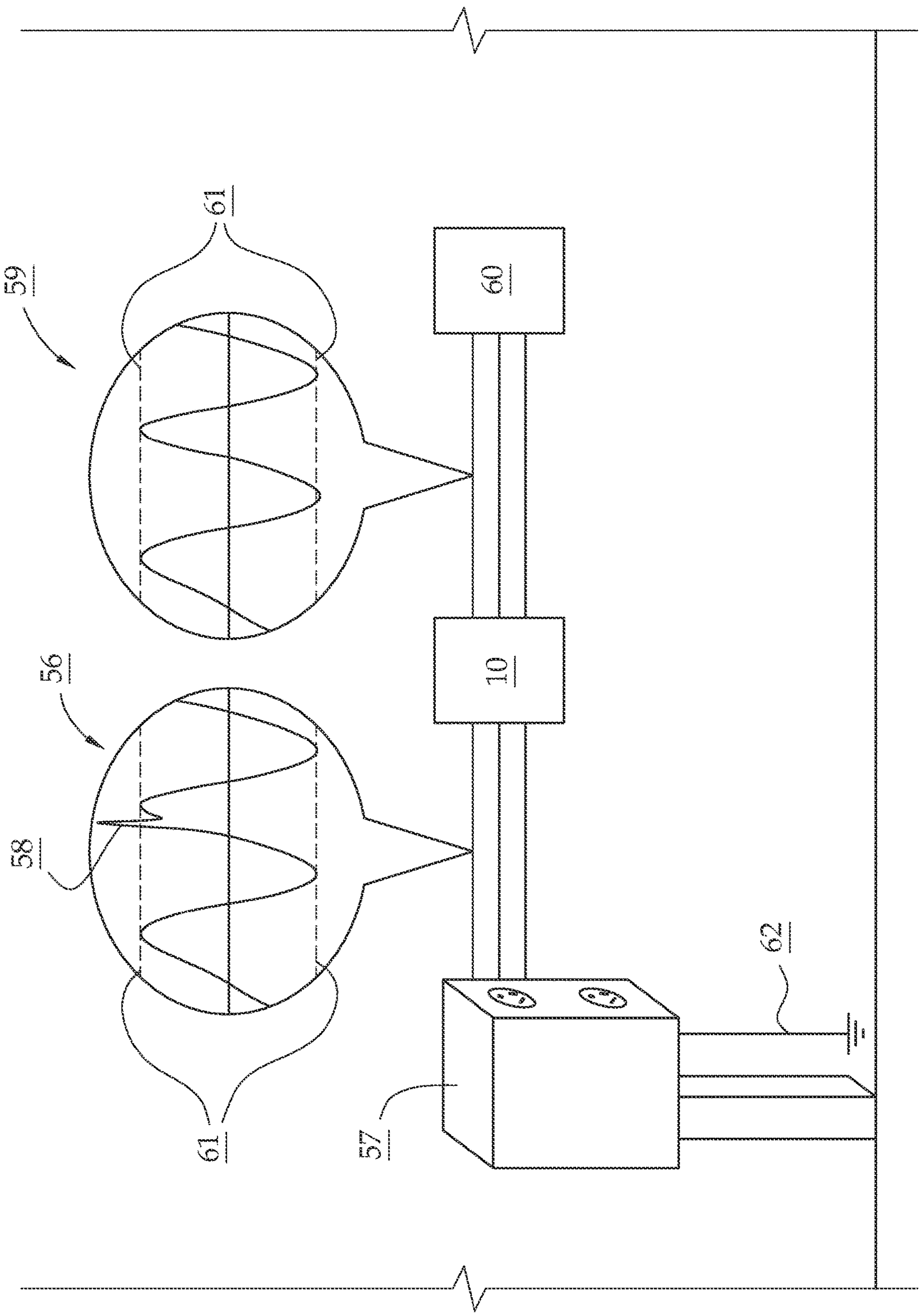
FIG. 8 presents a schematic representation of the power cable plug connector of FIG. 1 electrically connected to a power source.

FIG. 8 presents a schematic representation of the power cable plug connector 10 electrically connected to a power source 57 to conduct an incoming power signal 56 from the power source 57 and transmit a protected, non-transient power signal 59 to the system circuit 60. As shown in FIG. 8, the power source 57 (represented as an elevated RV power post) transmits the incoming power signal 56 through the power cable plug connector 10 when the power cable plug connector 10 engages the power source 57. The incoming power signal 56 in FIG. 8 may include a transient power signal 58 that is filtered out by the surge protector device 51 so that a protected, non-transient power signal 59 is generated and transmitted to the system circuit 60.

Figure 9:
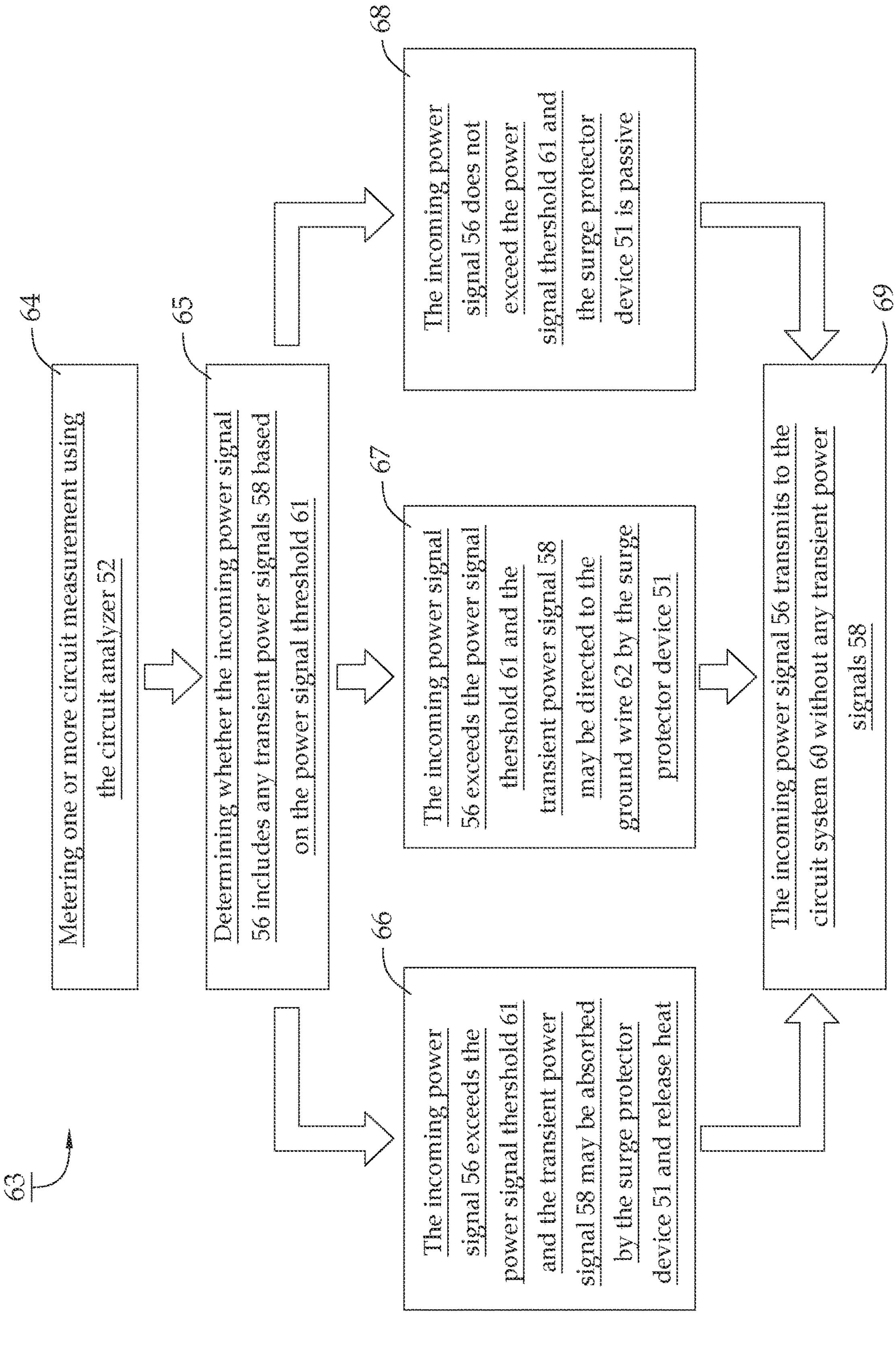
FIG. 9 is a flow chart illustrating a preferred method of operation of the power cable plug connector, surge protection device, and circuit analyzer, when the power cable plug connector engages a power source and starts conducting the incoming power signal.

FIG. 9 is a flow chart illustrating a preferred method of operation 63 of the power cable plug connector 10, surge protection device 51, and circuit analyzer 52, when the power cable plug connector 10 engages a power source 57 and starts conducting the incoming power signal 56. Preferred method 63 includes step 64 metering one or more circuit measurements with a circuit analyzer 52, the one or more circuit measurements including the voltage, current, amperage, and continuity of the incoming power signal 56 of the power source 57. Preferred method 63 also includes step 65 determining whether the incoming power signal 56 includes any transient power signals 58 based on the power signal threshold 61. The power signal threshold is determined based on the load specifications of the system circuit 60. In the event step 65 determines the incoming power signal 56 exceeds the power signal threshold 61, step 66 the surge protection device 51 satisfies the load specifications of the system circuit 60 by absorbing the energy of a transient power signal 58 from the incoming power signal 56 and dissipating energy of the transient power signal 58 as heat. In an alternative embodiment and method of operation, in the event step 65 determines that the incoming power signal 56 exceeds the power signal threshold 61, step 67 the surge protection device 51 satisfies the load specifications of the system circuit 60 by redirecting the transient power signal 58 to a ground wire 62. In the event step 65 determines the incoming power signal 56 does not exceed the power signal threshold 61, step 68 the surge protector 51 maintains a high impedance and remains passive so that the incoming power signal 56 bypasses the surge protector 51 and a protected, non-transient power signal 59 is transmitted to the circuit system 60. After the incoming power signal 56 is filtered by the surge protector 51, in the event of step 65 determining the incoming power signal 56 exceeds the power signal threshold 61, or the incoming power signal 56 bypasses the surge protector device 51, in the event of step 65 determining the incoming power signal 56 does not exceed the power signal threshold 61, the preferred method further includes step 69 transmitting a protected, non-transient power signal 59 is transmitted to the system circuit 60.

In another embodiment, as demonstrated in FIGS. 10-18, the present disclosure is represented as power cable plug connector 100 for conducting an incoming power signal 56 of a power source 57 and filtering a transient power signal 58 out of the incoming power signal 56 so that a protected, non-transient power signal 59 is transmitted to a system circuit 60. The power cable plug connector 100 may include a terminal housing 110, an electronics housing 111, and an outer housing 112. In the preferred embodiment of power cable plug connector 100 a terminal configuration 140 is positioned and securely retained within the terminal housing 110, an electronics configuration 120 is positioned and securely retained within the electrical housing 111, and the electronics housing 111 and terminal housing 110 are fastened together using a plurality of mechanical fasteners 154 to form an internal assembly 162. The internal assembly 162 is then molded over to form the outer housing 112. In the embodiment shown in FIGS. 10-18, the terminal housing 110 and the outer housing 112 may be formed using an overmolding process to form a single piece construction that seamlessly joins multiple components and assemblies together and to prevent debris, temperature, shock, moisture, and vibration from damaging the internal assembly 162. The electronics housing 111 shown in FIGS. 10-18 is preferably constructed of a hard, plastic material and may be formed using, for example, plastic injection molding. The electronics housing 111 may be a shroud that includes a silicone encapsulate 132 within the negative space of the electrical housing 111 to insulate and surround the electronics configuration 120 from, among other things, environmental conditions such as debris, temperature, shock, moisture, and vibration.

Figure 10:
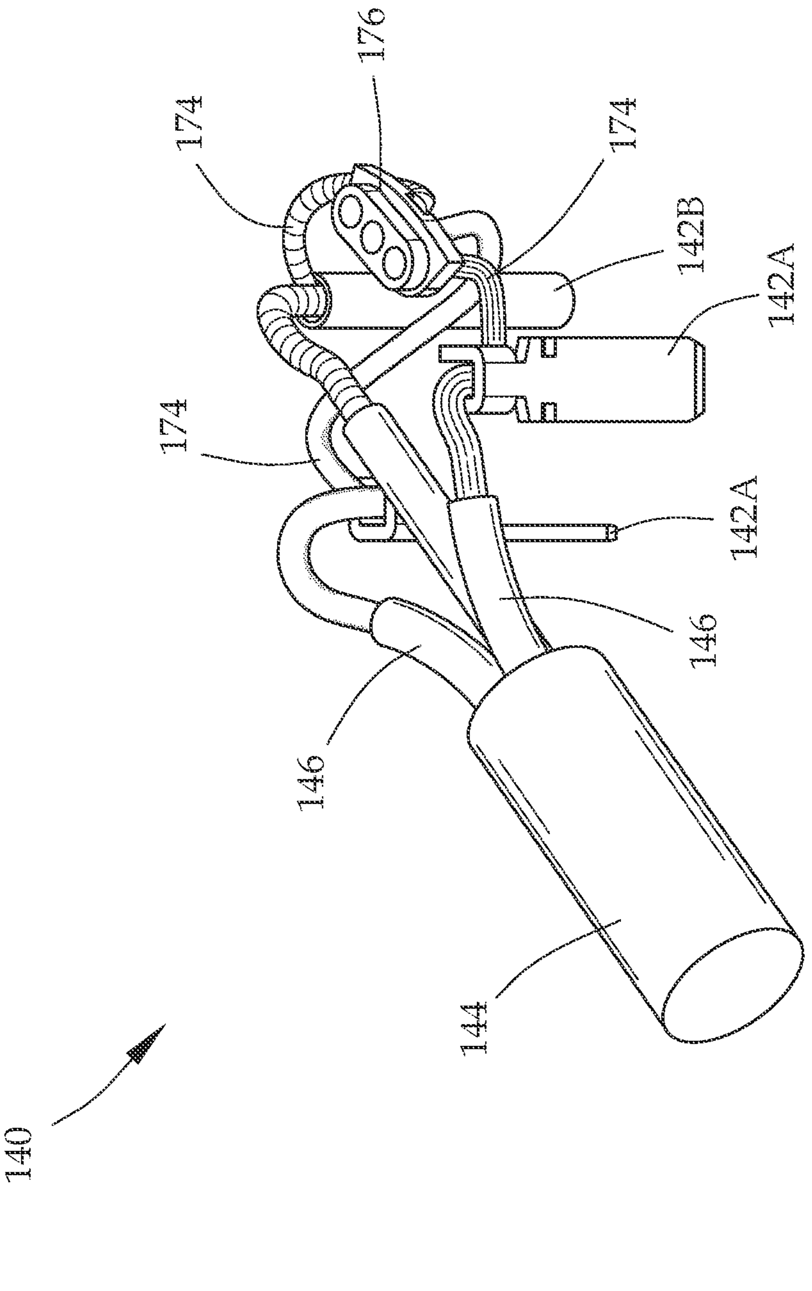
FIG. 10 shows a perspective view of the terminal configuration of the power cable plug connector of the present disclosure.

In the preferred embodiment of power cable plug connector 100, as shown in FIG. 10, the terminal configuration 140 may be arranged to engage a 30-amp power source and conduct the power signal of the 30-amp power source. In another embodiment the terminal configuration 140 may be arranged to engage a 50-amp power source and conduct the power signal of the 50-amp power source (not shown). In yet another embodiment, the terminal configuration 140 may be arranged to engage other power source configurations, such as a 15-amp or 20-amp power source. The terminal configuration 140 may include a plurality of contacts 142, such as one or more terminal blades 142A and a ground pin 142B, and a power cable 144 containing a plurality of power wires 146 which are in electrical communication with the system circuit 60. In the preferred embodiment, the contacts 142 are made of metal materials with high electrical conductivity, such as silver, copper, gold, platinum, palladium, and combinations thereof. In FIG. 10, two terminal blades 142A and a ground pin 142B are arranged to enable an electrical connection with a 30-amp power source. Each contact 142 of the terminal configuration 140 is electrically connected to a power wire 146 (i.e., three power wires 146 are illustrated in FIG. 10 and contained within the power cable 144) to facilitate electrical communication from the terminal configuration 140 to the power cable 144, which electrically connects the terminal configuration 140 to the rest of the system circuit 60. A connecting wire 174 may electrically connect each contact 142 to a first connector 176 positioned outside of the terminal housing 110. The first connector 176 facilitates the electrical communication between the connecting wire 174 and an electronics wire 130 of the electronics configuration 120, as will be described in further detail below. In the preferred embodiment, as would be understood by those skilled in the art, the one or more power wires 146 and the connecting wire 174 are electrically connected to the appropriate contact 142 using a screw wire clamp made of a conductive material.

Figure 11:
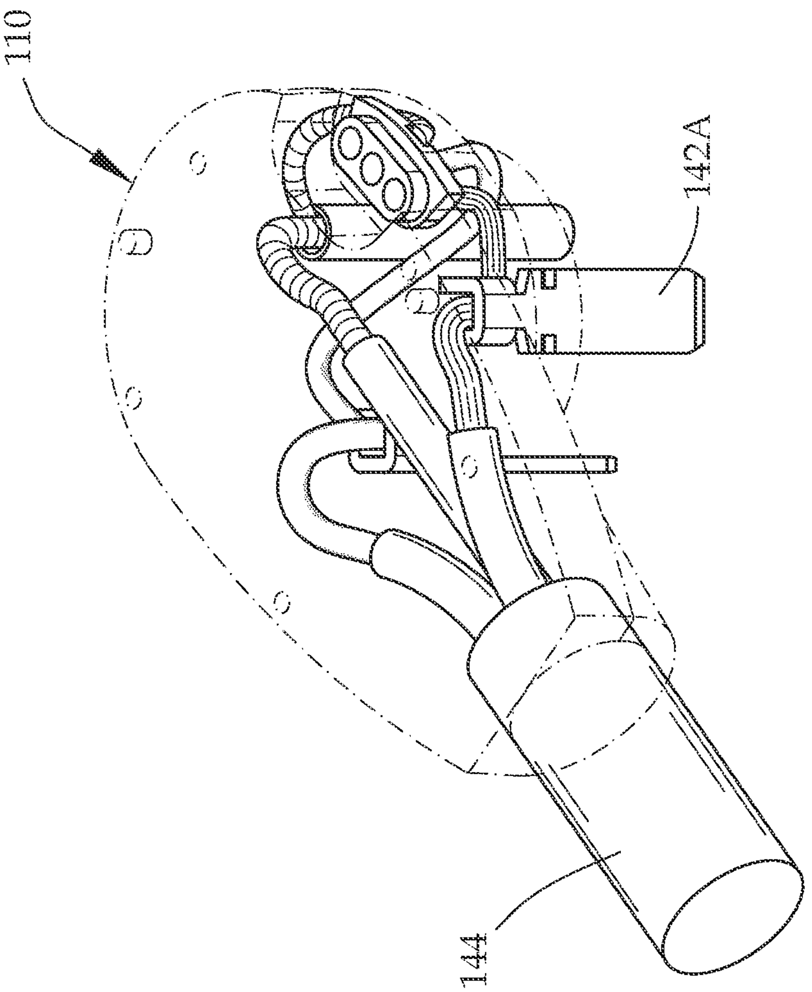
FIG. 11 is a view provided to illustrate how the terminal housing is formed by overmolding the terminal configuration of FIG. 10.

FIG. 11 is a view provided to illustrate how the terminal housing is formed by overmolding the terminal configuration of FIG. 10. Once the terminal configuration 140 is assembled (i.e., the appropriate power wire 146 is electrically connected to the appropriate contact 142, and the connecting wire 174 is electrically connected with the appropriate contact 142 and the first connector 176), the terminal configuration 140 is placed within a first mold cavity configured to represent and form the terminal housing 110. Then, molten material is injected into the first mold cavity, which represents and forms the shape of the terminal housing 110, until the molten material completely surrounds the terminal configuration 140. When the molten material has cooled, the material is removed from the first mold cavity and the terminal housing 140 is formed with a portion of the contacts 142 protruding from a bottom surface 148 of the terminal housing 140 and the power cable 144 protruding from a side surface 150 of the terminal housing 140.

Figure 12:
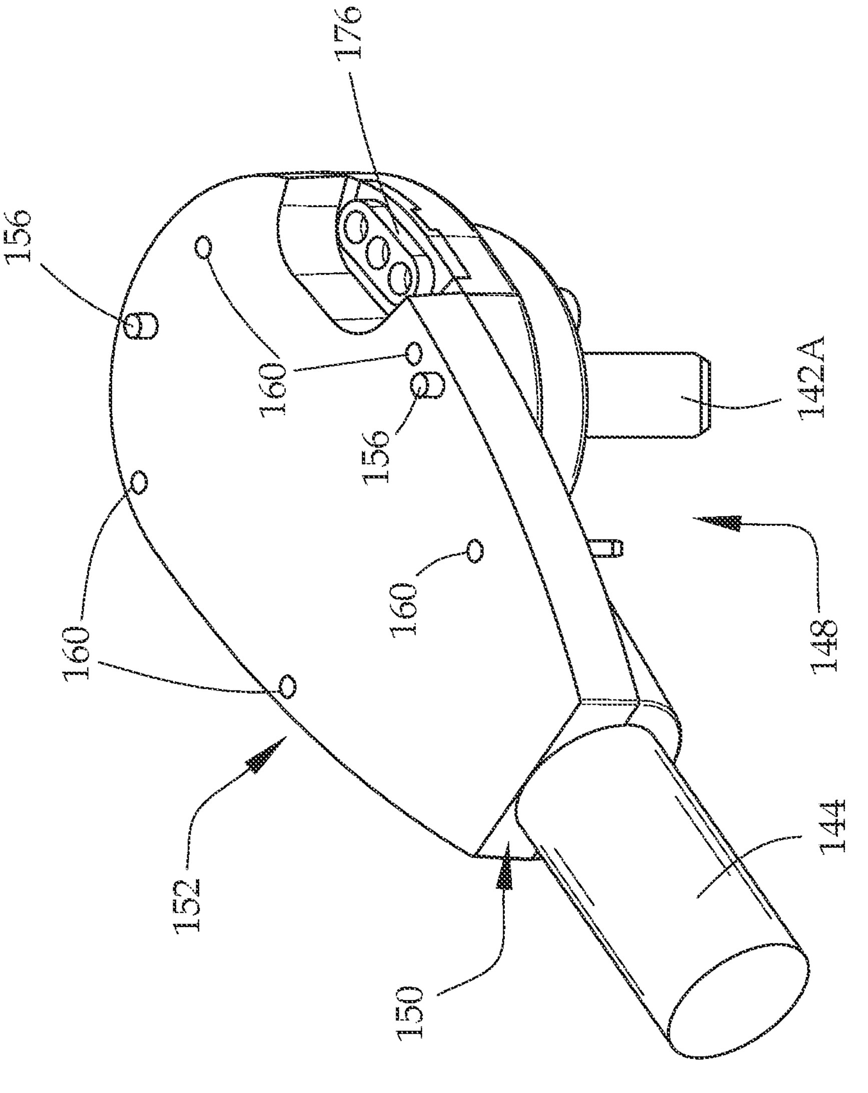
FIG. 12 illustrates a perspective view of the terminal housing of the power cable plug connector.

Overmolding the terminal configuration 140 creates a single piece construction housing that will effectively prevent debris, temperature, shock, moisture, and vibration from damaging the terminal configuration 140. As shown in FIGS. 10 and 11, in the preferred embodiment, the first connector 176 is positioned outside the terminal housing 110 to facilitate electrical communication between the terminal configuration 140 and the electronics configuration 120 as will be described in further detail below. As illustrated in FIG. 12, a top surface 152 of the terminal housing 110 defines a plurality of fastener apertures 160 configured to receive mechanical fasteners 154, as will be explained in further detail below. The top surface 152 of the terminal housing 110 may also include one or more guideposts 156 configured to align with one or more slots 158 configured around the electronics housing 111. The one or more guideposts 156 are configured to cooperatively align with the one or more slots 158 configured around the periphery of the electronics housing 111 and prevent rotation and maintain alignment between the electronics housing 111 and the terminal housing 110 while the mechanical fasteners 154 are threaded through one or more slots 158 and into the fastener apertures 160 formed in the top surface 152 of the terminal housing 110.

Figure 13:
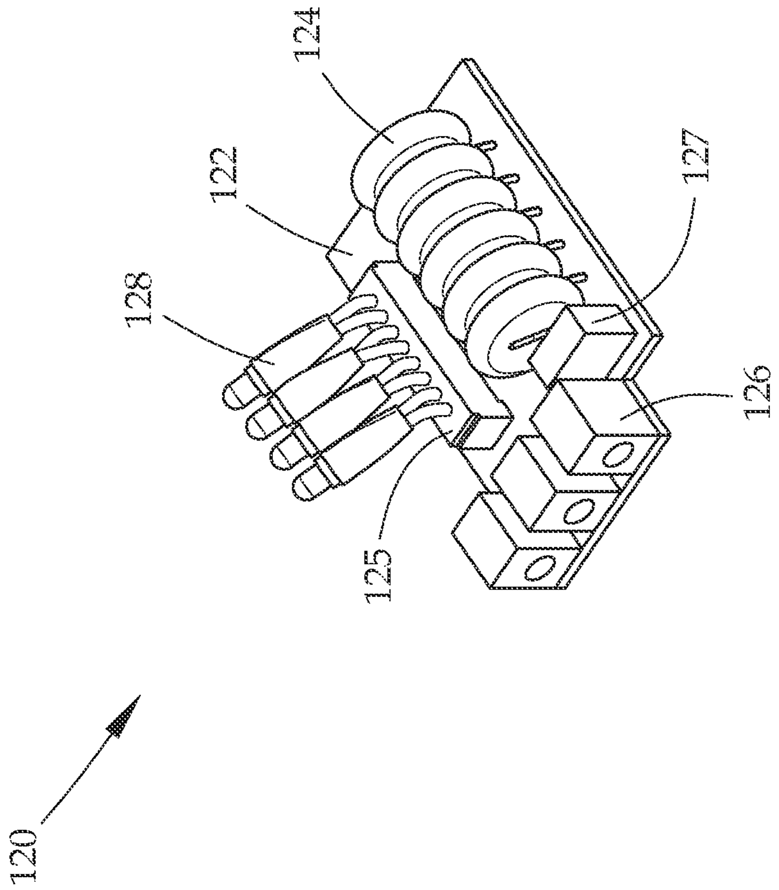
FIG. 13 depicts a perspective view of the electronics configuration of the power cable plug connector.
Figure 14:
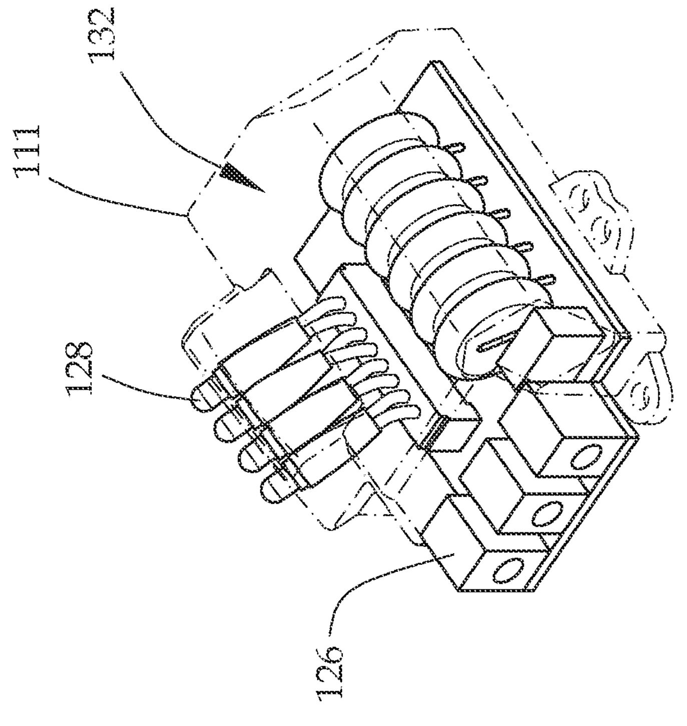
FIG. 14 is a view provided to illustrate how the electronics housing is positioned over the electronics configuration of FIG. 13 and how silicone encapsulate fills the negative space within the electronics housing.
Figure 15:
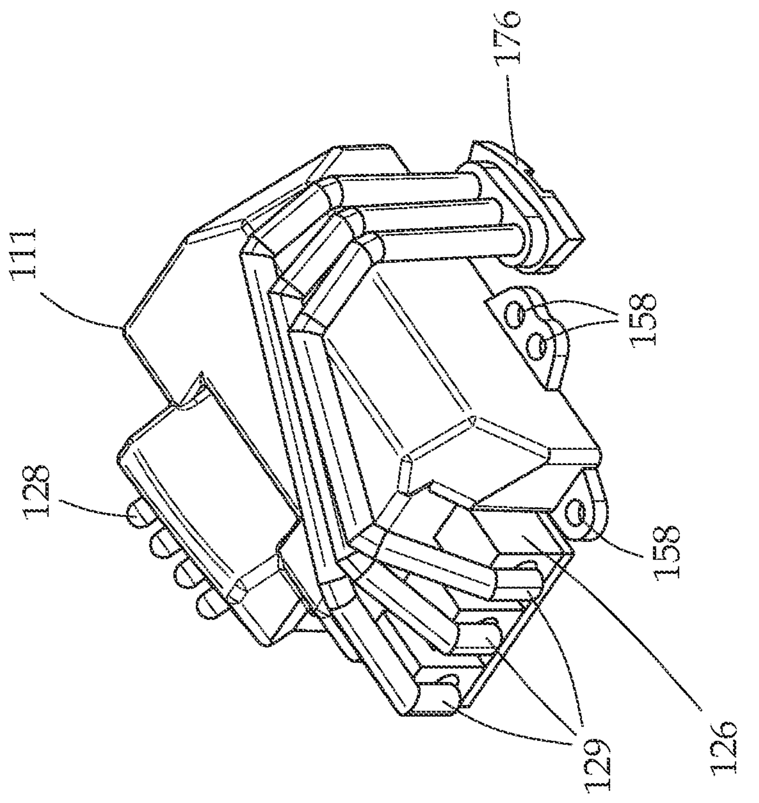
FIG. 15 features a perspective view of the electronics housing of the power cable plug connector of the present disclosure, the electronics housing including a plurality of wires electrically connected to a plurality of connectors.
Figure 16:
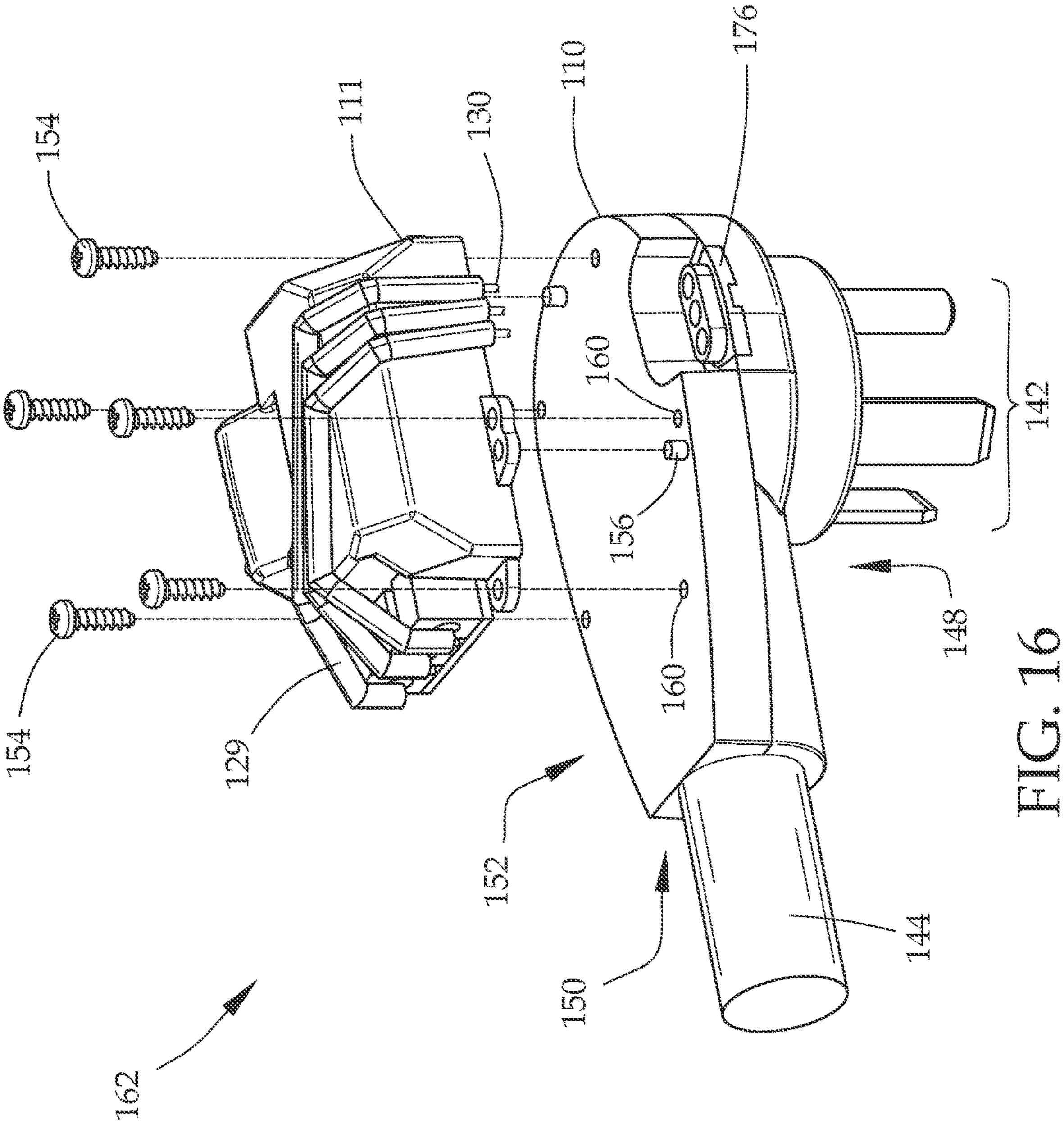
FIG. 16 shows an exploded view of the internal assembly, including the terminal housing molded over the terminal configuration, the electronics housing retaining and encapsulating the electronics configuration, and a plurality of mechanical fasteners that join the two together to form the internal assembly.

In the preferred embodiment, the power cable plug connector 100 includes an electronics configuration 120 positioned substantially within the electronics housing 111. The electronics configuration 120, as shown in FIGS. 13-15, may include a printed circuit board 122, a surge protection device 124, a circuit analyzer 125, a second connector 126, at least one LED display 128, and a plurality of electronics wires 130 for facilitating electrical communication with the terminal configuration 140. The electronics configuration 120 may further include a fuse 127 to protect the system circuit 60 from harmful transients. In the preferred embodiment, as best shown in FIG. 16, the plurality of electronics wires 130 may be encased in a protective tubing 129. In other embodiments, the plurality of electronics wires 130 are not encased in the protective tubing 129. The second connector 126 may be any configuration but generally will have as many connections as there are contacts 142 in the terminal configuration 140. As would be understood by those skilled in the art, the connectors 126, 176 described herein include metal components that conduct electricity and thermoplastic components that provide insultation and mechanical support. The second connector 126 facilitates a connection between the electronics configuration 120 and the terminal configuration 140 via the plurality of electronic wires 130. The printed circuit board 122 may include any number of connections to facilitate electrical communication throughout and between the components of the electronics configuration 120, the terminal configuration 140, and the rest of the system circuit 60. The surge protection device 124 preferably includes a plurality (six in the preferred embodiment) of metal-oxide-varistors ("MOVs") configured to dissipate up to 1,050 Joules out of an incoming power signal 56 when a predetermined transient power signal threshold 61 is reached. In other embodiments the surge protection device 124 may dissipate more than 1,050 Joules out of the incoming power signal 56 when the predetermined transient power signal threshold 61 is reached. The circuit analyzer 125 provides the real-time status of the system circuit 60 whereby the status is dependent on the one or more circuit measurements detected by the circuit analyzer 125, the one or more circuit measurements including the voltage, current, amperage, and continuity of the incoming power signal 56 of the power source 57. In the preferred embodiment, a plurality of LEDs 128 are electrically connected to the circuit analyzer 125 to display the real-time status of the system circuit 60. The second connector 126 is preferably arranged on the circuit board 122 such that it may facilitate the electrical connection between the electronics configuration 120 and the terminal configuration 140 via the plurality of electronic wires 130 electrically connected to the first connector 176 of the terminal configuration 140 and the second connector 126. The second connector 126 is also preferably positioned on the printed circuit board 122 such that when the electronics housing 111 is positioned on top of the electronics configuration 120, the second connector 126 is positioned outside the electronics housing 111. The second connector 126 may be any configuration but generally will have as many connections as there are contacts 142 in the terminal configuration 140. As can be understood from the illustration in FIG. 14, once the electronics configuration 120 is positioned within the electronics housing 111, a silicone encapsulate 132 is dispensed into the electronics housing 111 until the silicone encapsulate 132 completely surrounds the electronic configuration 120 and the silicone encapsulate 132 becomes solid. The silicone encapsulate 132 will ensure that the electronics configuration 120 is securely retained within the electronics housing 111 and the electronics configuration 120 is effectively protected from the environmental elements such as, but not limited to, debris, temperature, shock, moisture, and vibration. As best illustrated in FIG. 15, a portion of the electronics housing 111 includes one or more slots 158 configured around the periphery of the electronics housing 111 and are configured to align with one or more guideposts 156 formed on the top surface 152 of the terminal housing 110. One or more slots 158 may also align with the fastener apertures 160 formed in the top surface 152 of the terminal housing 110.

FIG. 16 shows an exploded view of the internal assembly 162, including the terminal housing 110 overmolded around the terminal configuration 140, the electronics housing 111 retaining and encapsulating the electronics configuration 120 with silicone encapsulate 132, and a plurality of mechanical fasteners 154 that join the terminal housing 110 and electronics housing 111 together to form the internal assembly 162. The internal assembly 162 is preferably formed by positioning the electronics housing 111 above the terminal housing 110 until one or more guideposts 156 and one or more fastener aperture 160 located on the top surface 152 of the terminal housing 110 align with the slots 158 formed around the periphery of the electronics housing 111. The guideposts 156 are inserted through the slots 158 to prevent inadvertent rotation between the electronics housing 111 and terminal housing 110. A plurality of fasteners 154 are inserted through the slots 158 into the fastener apertures 160 and are used to mechanically join the terminal housing 110 to the electronics housing 111. After the electronics housing 111 is secured to the top surface 152 of the terminal housing 110, a plurality of electronics wires 130 are connected to the first connector 176 and the second connector 126, effectively establishing electrical communication between the two.

Figure 17:
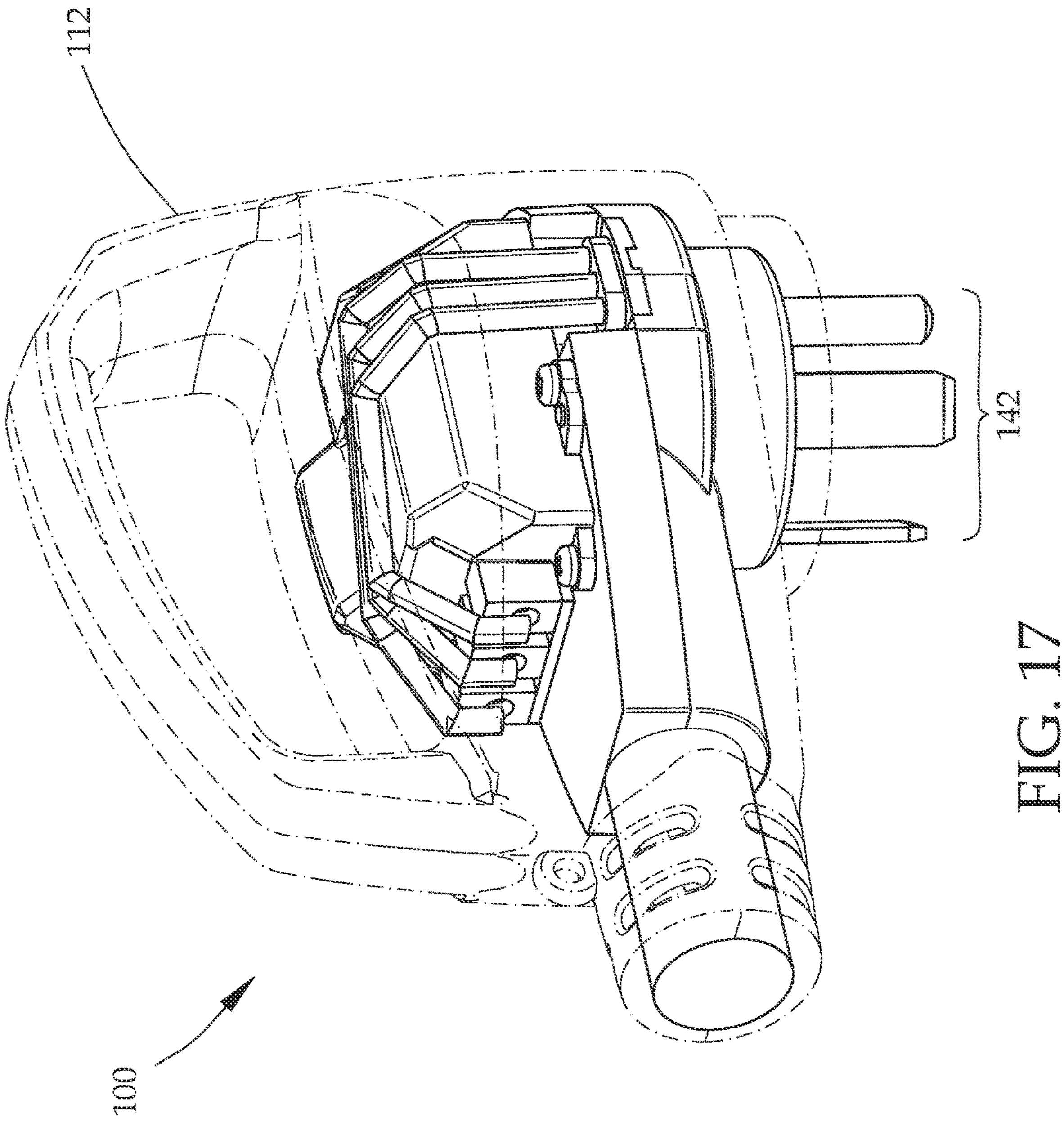
FIG. 17 is a view provided to demonstrate how the internal assembly is overmolded to form an outer housing.

As shown in FIG. 17, after the electronics housing 111 is fastened to the terminal housing 110, forming the internal assembly 162, the entire internal assembly 162 is positioned within a second mold cavity configured to represent the outer housing 112. The outer housing 112, like the terminal housing 110, is an overmolded housing formed by injecting a second molten material into the second mold cavity and letting it cool until the outer housing 112 is formed. The material used to overmold the terminal configuration 140 may be the same material used to overmold the internal assembly 162. The outer housing 112 completely surrounds the internal assembly 162 and ensures that the components of the internal assembly have an increased resistance to shock, vibration, moisture, and temperature. The outer housing 112 forms a handle 164 for gripping the power cable plug connector 100, a strain clamp 166 for relieving strain on the power cable 144, and an opening 168 for viewing the LED display 128 of the electronics configuration 120. The handle 164 may be constructed of a non-conducting material to further enhance the safety of power cable plug connector 100 by inhibiting circuit flow through the handle 164. The handle 164 is preferably a pull handle, wherein both ends of the handle 164 are integrally formed with the outer housing 112.

Figure 18:
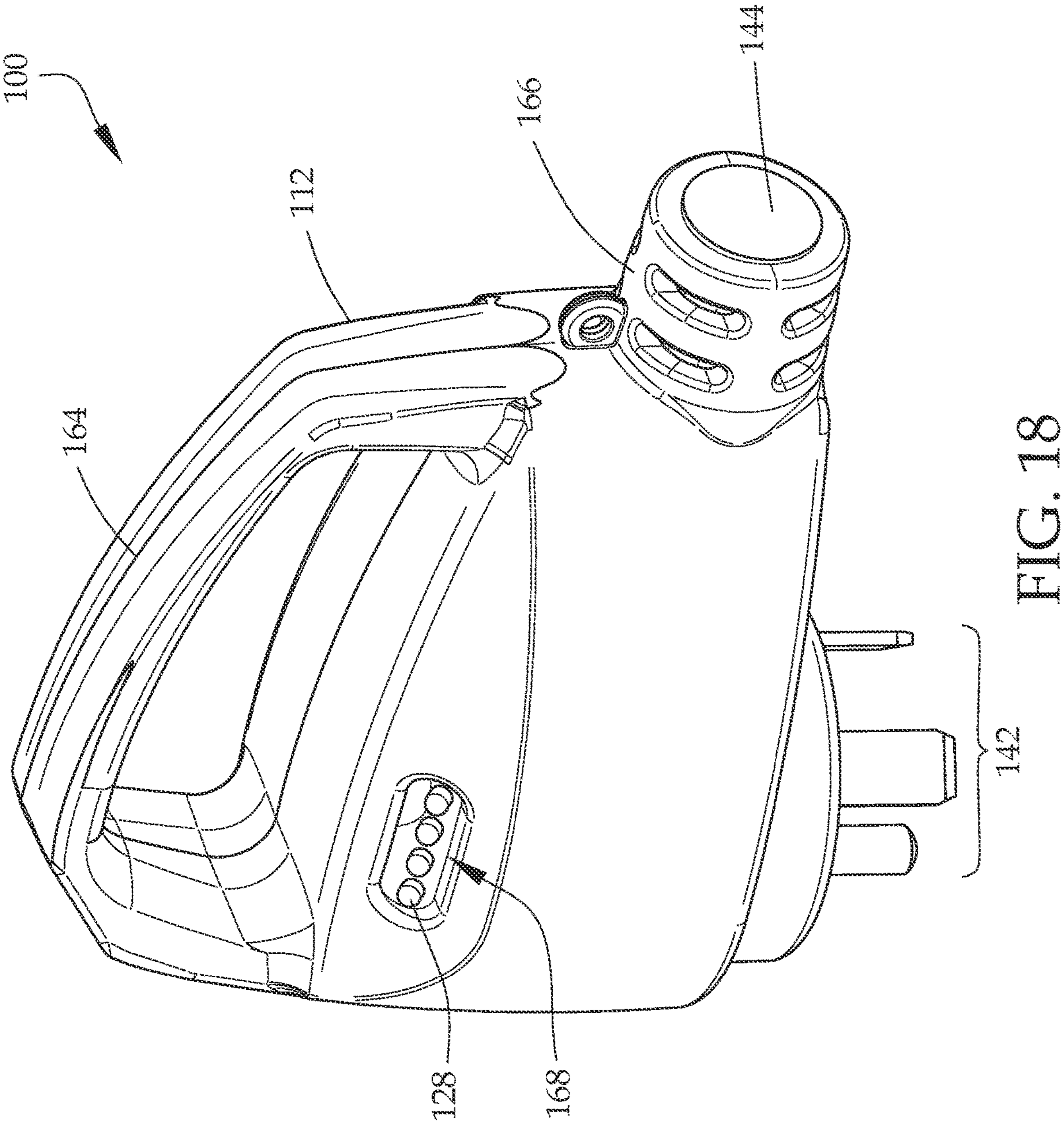
FIG. 18 presents a perspective view of the power cable plug connector of the present disclosure shown from the opposite side as compared to FIG. 17.

FIG. 18 is a perspective view of a power cable plug connector of the present disclosure shown from the opposite side as compared to FIG. 17. The outer housing 112 defines an opening 168 to allow at least one LED display 128 to protrude from the outer housing 112 to be visible when a user grips the handle 164 of the power cable plug connector 100 to indicate a status of the system circuit 60.

The illustrations and examples provided herein are for explanatory purposes and are not intended to limit the scope of the appended claims.

We claim:

1. A power cable plug connector (100) device comprising:

an internal assembly (162) comprising:

an electronics configuration (120) including a printed circuit board (122), a surge protection device (124), and a second connector (126); and a terminal configuration (140) including at least one or more contacts (142), a first connector (176), a power cable (144), and at least one power wire (146) partially enclosed within the power cable (144) and electrically connected to the one or more contacts (142); and an outer housing (112) formed by overmolding the internal assembly (162);

whereby the internal assembly (162) conducts an incoming power signal (56), filters a transient power signal (58), and detects one or more circuit measurements so that a protected, non-transient power signal (59) is transmitted to a system circuit (60) via the power wire (146), and wherein an electronics housing (111) is configured to receive the electronics configuration (120) such that the second connector (126) is positioned outside the electronics housing (111).

2. The device of claim 1, wherein a silicone encapsulate (132) fills negative space within the electronics housing (111) after the electronics configuration (120) is placed therein.

3. The device of claim 1, wherein a terminal housing (110) is formed by overmolding the terminal configuration (140) after the power wires (146) of the power cable (144) are electrically connected to the one or more contacts (142).

4. The device of claim 3, wherein the terminal housing (110) is configured to retain the terminal configuration (140) such that the first connector (176) is positioned outside the terminal housing (110).

5. The device of claim 1, further comprising a connecting wire (174) electrically connected to the one or more contacts (142) and the first connector (176) positioned outside of a terminal housing (110).

6. The device of claim 1, wherein a plurality of electronics wires (130) facilitates electrical communication between the first connector (176) and the second connector (126).

7. The device of claim 1, wherein the surge protection device (124) defines a variable resistor configured to conduct the incoming power signal (56) and filter the transient power signal (58) away from the incoming power signal (56) when the incoming power signal (56) exceeds the predetermined power signal threshold (61) so that the protected, non-transient power signal (59) propagates throughout the system circuit (60).

8. The device of claim 1, wherein the electronics configuration (120) further includes a circuit analyzer (125) for detecting the one or more circuit measurements.

9. The device of claim 8, wherein the electronics configuration (120) further includes an electrically connected LED display (128) for indicating a circuit status based on the one or more circuit measurements detected by the circuit analyzer (125).

10. The device of claim 1, wherein the outer housing (112) forms a handle (164) to facilitate gripping the device (100).

11. The device of claim 1, wherein the terminal configuration (140) comprises three contacts (142) configured and arranged to engage a 20-amp or 30-amp power source receptacle.

12. The device of claim 1, wherein the terminal configuration (140) comprises four contacts (142) configured and arranged to engage a 50-amp power source receptacle.

13. A power cable plug connector (100) device comprising:

an internal assembly (162) comprising:

a terminal configuration (140) including at least one or more contacts (142), a power cable (144) and one or more power wires (146), wherein the one or more power wires (146) are electrically connected to the one or more contacts (142), and wherein the terminal configuration (140) is overmolded forming a terminal housing (110); and an electronics configuration (120) including a printed circuit board (122), a surge protection device (124), a circuit analyzer (125), wherein the electronics configuration (120) is positioned substantially inside an electronics housing (111); and wherein the surge protection device (124) defines a variable resistor configured to conduct the incoming power signal (56) and filter the transient power signal (58) away from the incoming power signal (56) when the incoming power signal (56) exceeds the predetermined power signal threshold (61) so that the protected, non-transient power signal (59) propagates throughout the system circuit (60); and wherein the electronics housing (111) is mechanically fastened to a top surface (152) of the terminal housing (110)

whereby the internal assembly (162) conducts an incoming power signal (56), filters a transient power signal (58), and detects one or more circuit measurements so that a protected, non-transient power signal (59) is transmitted to a system circuit (60) via the power wire (146).

14. The device of claim 13, wherein a silicone encapsulate (132) fills negative space within the electronics housing (111) after the electronics configuration (120) is placed therein.

15. The device of claim 13, wherein the outer housing (112) is made of a thermoplastic material.

16. The device of claim 13, wherein the terminal configuration (140) comprises three contacts (142) configured and arranged to engage a 20-amp or 30-amp power source receptacle.

17. The device of claim 13, wherein the terminal configuration (140) comprises four contacts (142) configured and arranged to engage a 50-amp power source receptacle.

18. The device of claim 13, wherein the terminal configuration (140) includes a first connector (176), and the electronics configuration (120) includes a second connector (126), and a plurality of electronics wires (130) facilitate electrical communication between the first connector (176) and the second connector (126).

19. A power cable plug connector (100) device comprising:

an internal assembly (162) comprising:

an electronics configuration (120) including a printed circuit board (122), a surge protection device (124), and a second connector (126); and a terminal configuration (140) including at least one or more contacts (142), a first connector (176), a power cable (144), and at least one power wire (146) partially enclosed within the power cable (144) and electrically connected to the one or more contacts (142); and an outer housing (112) formed by overmolding the internal assembly (162);

whereby the internal assembly (162) conducts an incoming power signal (56), filters a transient power signal (58), and detects one or more circuit measurements so that a protected, non-transient power signal (59) is transmitted to a system circuit (60) via the power wire (146); and wherein a plurality of electronics wires (130) facilitates electrical communication between the first connector (176) and the second connector (126).

20. The device of claim 19, wherein the surge protection device (124) defines a variable resistor configured to conduct the incoming power signal (56) and filter the transient power signal (58) away from the incoming power signal (56) when the incoming power signal (56) exceeds the predetermined power signal threshold (61) so that the protected, non-transient power signal (59) propagates throughout the system circuit (60).

* * * * *